US008380877B2

(12) United States Patent
Haugland et al.

(10) Patent No.: US 8,380,877 B2
(45) Date of Patent: Feb. 19, 2013

(54) MASS GENERATION OF INDIVIDUAL VIRTUAL SERVERS, VIRTUAL WEB SITES, AND VIRTUAL WEB OBJECTS

(76) Inventors: Henry Haugland, Natick, MA (US); Linda Wollschlager, Natick, MA (US)

(*) Notice: Subject to any disclaimer, the term of this patent is extended or adjusted under 35 U.S.C. 154(b) by 0 days.

(21) Appl. No.: 13/118,902

(22) Filed: May 31, 2011

(65) Prior Publication Data
US 2011/0231523 A1 Sep. 22, 2011

Related U.S. Application Data

(62) Division of application No. 09/513,845, filed on Feb. 25, 2000, now abandoned.

(60) Provisional application No. 60/122,086, filed on Feb. 26, 1999, provisional application No. 60/122,087, filed on Feb. 26, 1999.

(51) Int. Cl.
*G06F 15/16* (2006.01)
*G06Q 13/00* (2006.01)

(52) U.S. Cl. ..... 709/245; 709/225; 709/229; 707/999.1; 705/14.66

(58) Field of Classification Search .......... 709/245, 709/225, 229; 705/14.66; 707/999.1
See application file for complete search history.

(56) References Cited

U.S. PATENT DOCUMENTS

| | | | | | |
|---|---|---|---|---|---|
| 5,375,240 | A | * | 12/1994 | Grundy | 726/28 |
| 5,377,323 | A | * | 12/1994 | Vasudevan | 709/226 |
| 5,664,185 | A | * | 9/1997 | Landfield et al. | 1/1 |
| 5,805,820 | A | * | 9/1998 | Bellovin et al. | 709/225 |
| 5,819,265 | A | * | 10/1998 | Ravin et al. | 1/1 |
| 5,999,929 | A | * | 12/1999 | Goodman | 1/1 |
| 6,009,410 | A | * | 12/1999 | LeMole et al. | 705/14.54 |
| 6,016,512 | A | * | 1/2000 | Huitema | 709/245 |
| 6,029,141 | A | * | 2/2000 | Bezos et al. | 705/27.1 |
| 6,061,356 | A | * | 5/2000 | Terry | 370/401 |
| 6,092,178 | A | * | 7/2000 | Jindal et al. | 712/27 |
| 6,108,703 | A | * | 8/2000 | Leighton et al. | 709/226 |
| 6,182,109 | B1 | * | 1/2001 | Sharma et al. | 718/104 |
| 6,185,575 | B1 | * | 2/2001 | Orcutt | 1/1 |
| 6,199,068 | B1 | * | 3/2001 | Carpenter | 1/1 |
| 6,230,168 | B1 | * | 5/2001 | Unger et al. | 715/206 |
| 6,262,987 | B1 | * | 7/2001 | Mogul | 370/400 |
| 6,275,900 | B1 | * | 8/2001 | Liberty | 711/120 |
| 6,286,047 | B1 | * | 9/2001 | Ramanathan et al. | 709/224 |
| 6,289,342 | B1 | * | 9/2001 | Lawrence et al. | 1/1 |
| 6,351,775 | B1 | * | 2/2002 | Yu | 709/238 |
| 6,415,323 | B1 | * | 7/2002 | McCanne et al. | 709/225 |
| 6,430,621 | B1 | * | 8/2002 | Srikanth et al. | 709/238 |
| 6,470,345 | B1 | * | 10/2002 | Doutre et al. | 1/1 |
| 6,480,856 | B1 | * | 11/2002 | McDonald et al. | 1/1 |

(Continued)

OTHER PUBLICATIONS

Elz et al., "RFC 2181—Classifcations to the DNS Specification," Network Working Group, RGnet, Inc. Jul. 1997.*

(Continued)

*Primary Examiner* — Alina N. Boutah
(74) *Attorney, Agent, or Firm* — Norma E. Henderson

(57) ABSTRACT

Techniques for inducing a contact to invoke a resource prepared by a promoter when the resource resides on a network include generating a resource location description for the resource. The resource location description includes a name of the contact. The promoter provides access to the resource at a location on the network according to the resource location description and also prepares a message to notify the contact about the resource location description. Thus a promoter can provide a web site for each contact whom the promoter has identified. Each web site can have a domain name that prominently displays the contact's identity. The psychological benefit to the contact of finding a web site devoted to the contact and with the contact's own identity as part of the domain name conditions the contact favorably and increases the chances that the result sought by the promoter will be achieved.

24 Claims, 15 Drawing Sheets

U.S. PATENT DOCUMENTS

| | | | |
|---|---|---|---|
| 6,578,066 B1 * | 6/2003 | Logan et al. | 718/105 |
| 6,654,891 B1 * | 11/2003 | Borsato et al. | 726/6 |
| 6,658,662 B1 * | 12/2003 | Nielsen | 725/109 |
| 6,718,387 B1 * | 4/2004 | Gupta et al. | 709/226 |
| 6,785,738 B1 * | 8/2004 | Ivaturi | 709/245 |
| 6,816,957 B1 * | 11/2004 | Halladay et al. | 711/170 |
| 6,834,302 B1 * | 12/2004 | Harvell | 709/224 |
| 7,089,211 B1 * | 8/2006 | Trostle et al. | 705/51 |
| 7,117,227 B2 * | 10/2006 | Call | 709/219 |
| 7,120,590 B1 * | 10/2006 | Eisen et al. | 705/14.73 |
| 7,143,055 B1 * | 11/2006 | Perkowski | 705/14.34 |
| 2001/0049741 A1 * | 12/2001 | Skene et al. | 709/232 |
| 2002/0052876 A1 * | 5/2002 | Waters | 707/100 |
| 2005/0144323 A1 * | 6/2005 | Gardos et al. | 709/245 |
| 2009/0154681 A1 * | 6/2009 | Kung et al. | 379/211.02 |

OTHER PUBLICATIONS

P. Mockapetris, "RFC 1034—Domain Names—Concepts and Facilities," Network Working Group, ISI, Nov. 1987.*
CNAME Record definition from Wikipedia, the Free Encyclopedia, printed Apr. 5, 2012.*

* cited by examiner

| Promotion | contact first name | contact last name | contact company | contact address | contact phone # | host name | IP address |
|---|---|---|---|---|---|---|---|
| Sweaters Inc. Spring 2000 | John | Smith | Fancy Store | Central Park, NY | (111) 555-1000 | john-smith. sld2.com | w.x.y.z1 |
| Sweaters Inc. Spring 2000 | Mary | Jones | Mom&Pop | Main St., FL | (555) 555-1001 | mary-jones. sld3.com | w.x.y.z1 |
| Sweaters Inc. Spring 2000 | Mary | Smith | Fancy Store | Rodeo Dr. CA | (999) 555-1010 | mary-smith. sld4.com | w.x.y.z4 |
| Sweaters Inc. Spring 2000 | John | Jones | Depart. Store | Michigan Ave, IL | (333) 555-1100 | john-jones. sld5.com | w.x.y.z4 |
| Sweaters Inc. Spring 2000 | Mary | Smith | Boutique A | Fifth Ave, NY | (111) 555-1111 | mary-smith. sld2.com | w.x.y.z1 |
| Sweaters Inc. Spring 2000 | John | Smith | Famous Store | Penn. Ave DC | (222) 555-1234 | john-smith. sld3.com | w.x.y.z1 |
| Sweaters Inc. Spring 2000 | Mary | Smith | Little Shoppe | Bourbon St., LA | (777) 555-1001 | mary-smith. sld5.com | w.x.y.z4 |

Figure 5A

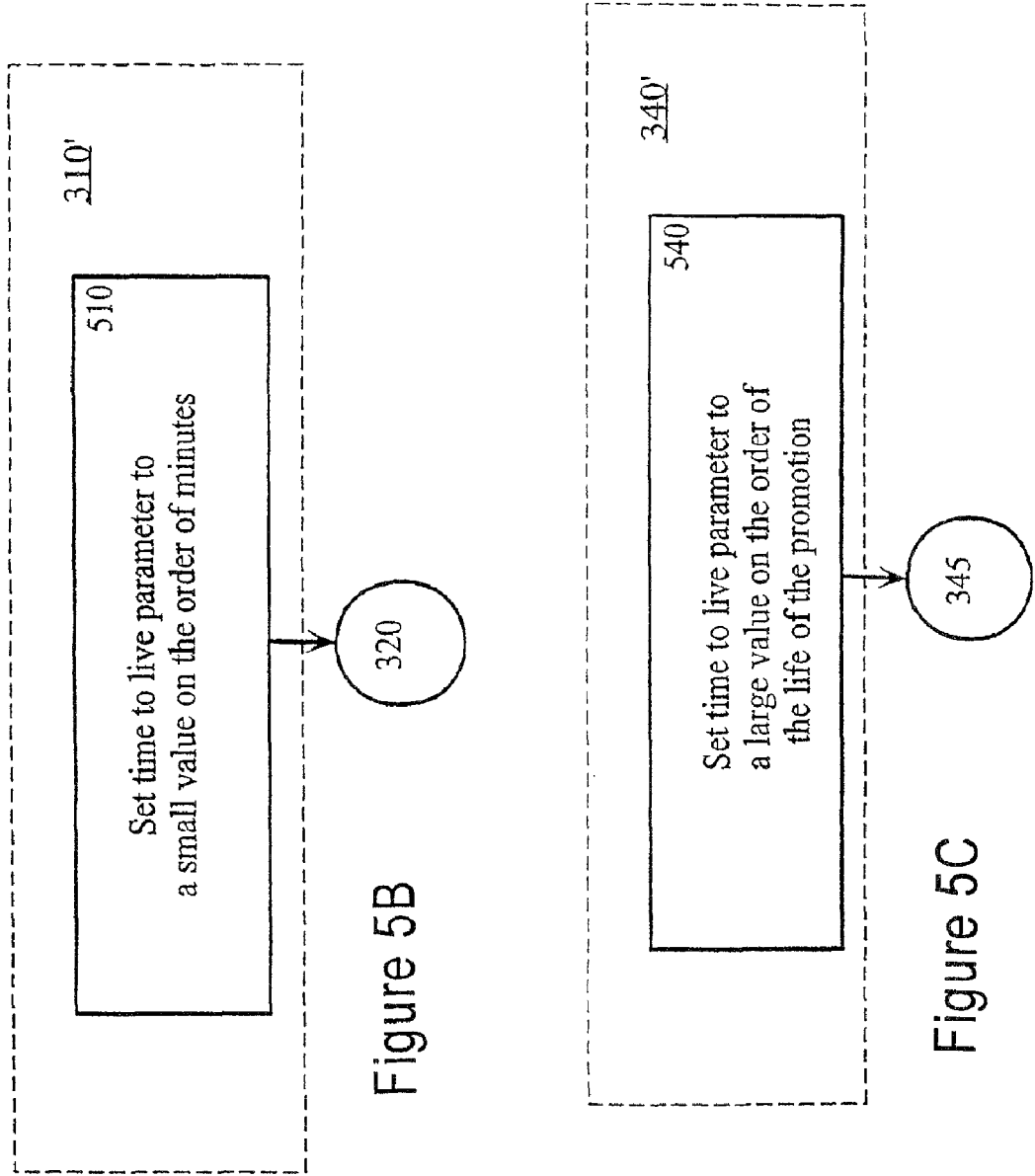

MASS GENERATION OF INDIVIDUAL VIRTUAL SERVERS, VIRTUAL WEB SITES, AND VIRTUAL WEB OBJECTS

RELATED APPLICATIONS

This application is a divisional of U.S. patent application Ser. No. 09/513,845, filed Feb. 25, 2000, the entire disclosure of which is herein incorporated by reference, which claims the benefit of U.S. Provisional Application Ser. No. 60/122,087, filed Feb. 26, 1999, the entire disclosure of which is herein incorporated by reference.

FIELD OF THE TECHNOLOGY

The present invention relates to establishing servers on the Internet, and in particular to techniques for the automated generation of a large number of virtual servers for use as web sites and for providing other Internet services.

BACKGROUND

The Internet refers to a worldwide network of networks. Information travels between computers connected to the Internet by a series of one or more packets of electronic signals. Each packet contains an address indicating the destination for the packet and contains information content or payload for use by special programs (servers) running on the device at the destination. A numeric address called an Internet Protocol address (IP address, also called Internet address) is used by equipment called routers, bridges, or "brouters" comprising the Internet to direct packets to devices connected to the Internet. A domain name is a convenient way for human beings to remember and identify the location of services available from servers distributed over the Internet. Therefore, a device having an IP address on the Internet is frequently associated with one or more domains each with a unique domain name. Services available on the Internet include file transfer using a file transfer protocol (FTP), electronic mail, and the World Wide Web.

The World Wide Web (WWW) refers to a set of information files, called web pages, having standard formats such as the Hypertext Markup Language (HTML) and transmitted according to the Hypertext Transfer Protocol (HTTP), and distributed across various computers connected to the Internet. A browser program (client) running on a user computer connected to the Internet can request, receive, interpret and display the information in a web page by exchanging packets over the Internet with a program (web server) running on a host computer where the web page resides. Web pages on the WWW are organized by web sites. Each web site is associated with a domain name on the Internet.

The Internet is a hierarchical network of networks, anticipating that a member of any network can itself be a network. Thus both the IP address and the domain name of web sites are organized into hierarchies.

An IP address, in general, is a 32 bit number that includes a network number, a host number or "HOSTID", and a leading set of one or more bits indicating a convention for dividing the remaining bits between the network number and the computer number. It is useful to think of an IP address as identifying a particular physical connection to the Internet. In general, a particular physical device on the Internet has one or more IP addresses. The convention bits and the network numbers are administered by the Internet agencies. A given network having a network number (called here a local network) on the Internet controls the host numbers within the IP address that follow the network number of the local network. Since the host can itself be a network, the local network may allocate a range of host numbers for the network host to apportion to the various components of the host's network. The32 bit IP address is often written as four 8-bit numbers (octets) separated by dots ".," where each octet is replaced by it decimal equivalent. The decimal range for an octet is 0 to 255. Plans and proposals exist to implement a 64-bit IP address structure. It is anticipated that the basic philosophy of operation will be consistent with the present 32-bit structure.

The Domain Naming System (DNS) is an Internet service that associates a domain name with an IP address. The DNS is distributed over a set of one or more domain name servers (or simply name servers) running on computers connected to the Internet. The name servers are special programs running on certain computers having known IP addresses. The name servers maintain records associated with a particular domain name. The DNS requires that a unique domain name be associated with a particular IP address. Several domain names can be associated with the same IP address; but a unique domain name cannot be associated with multiple IP addresses. Thus the DNS system provides a many-to-one or a one-to-one mapping from domain names to IP addresses.

With this convention, a user can indicate a web site by its associated domain name, and the DNS can be utilized to map the domain name to an IP address. The packets are then routed using the IP address. At the destination domain server, running on the computer at the IP address uniquely identified by the domain name, other information in the packet can be used to determine how the packet is processed. The DNS system allows a user of the Internet to retain a DNS name even though the physical device or its physical connection to the Internet, hence its IP address, changes. This is done by modifying the IP address associated with a DNS name on the proper name server.

According to the DNS, a domain includes the form
SLDname.TLDname
where TLD indicates a top-level domain, and SLD indicates a second level domain (also sometimes called a primary domain). Currently there are at least five international top level domain names including "com", "edu", "int", "org", and "net" and two other TLD names used without country codes "gov", and "mil". Country specific top-level domain names include for example, "us" and "uk" for the United States and Great Britain. The bodies that determine conventions used on the Internet and by the DNS are considering adding additional top level international domain names. The SLD to the left of the period, is a unique name (within a given TLD) as registered with the DNS. The portion of a domain name to the left of the ".TLDname" is referred to as the host name since it identifies a specific host where a server can reside. The DNS is responsible for mapping the SLDname.TLDname to an IP address of a computer running the domain server. Every registered SLD name has an entry in one of thirteen (13) "root name servers" that contains the physical IP addresses of two or more name servers responsible for translating a host name with that SLD name to an IP address.

The DNS is hierarchical and allows domain names to be constructed with multiple levels. However, the maintenance of the domain names and mapping to IP addresses of each additional level is the responsibility of a name server, typically the domain name server. In general, a domain name has the form:
. . . 3LDname.SLDname. TLDname
where 3LD refers to a third ($3^{rd}$) level domain name and the ellipses indicates that additional levels can be added to the left. The levels are separated by dots "." and level order increases to the left. Uniqueness of a domain name is assured if each name at a given level is different from every other name at that level. The same name can be used in different levels.

For example, a device identified by the SLD name "CollegeUniversity" and TLD "edu" can refer to a particular computer of the College University computer system. The particular computer has a particular IP address, say 111.255.55.01, at which it is connected to the Internet, and this particular computer runs a SLD domain server. Various computers and storage devices distributed over various departmental computer centers are connected to the domain server computer in a local network. The main computer in the physics department computer center of the above College University might have the IP address 111.255.55.05 and can be identified by the subdomain name "physics" and therefore has the full domain name of "physics.CollegeUniversity.edu". Similarly, the psychology department computer center may have the IP address of 111.255.55.10 and domain name "psychology.CollegeUniversity.edu". The network administration authority at CollegeUniversity.edu must establish and maintain name servers that map "physics.CollegeUniversity.edu" and "psychology.CollegeUniversity.edu" to their respective IP addresses. At the next level, the Astronomy section's graphics engine computer with IP address 111.255.55.07 connected to the physics computer center main computer can be identified by the fourth level name "astronomygraphics" of the third level domain "physics." The full domain name of this computer would be "astonomygraphics.physics.CollegeUniversity.edu". The mapping of forth level domain name "astronomygraphics" to its IP address is the responsibility of the name servers set up for the "CollegeUniversity.edu" domain which may or may not be the same as the SLD name servers.

A level of domain names need not be associated with a particular portion of the IP address. That is, a SLD name need not be associated with a particular local network, as in the above example, but instead can refer to a particular computer or host number within a local network. For example, if an Internet service provider (ISP) named Happynet has a local network number of 222.233.44 and several computers with host numbers of 0.00 through 0.25, an SLD domain server can be established on the single computer having an IP address of 22.233.44.00 with a SLD name "Happynet1" and a SLD domain server can be established on the single computer having an IP address of 222.233.44.17 with a SLD name "JoeDoe". Thus the same local network can have different SLD names.

While the IP address refers to physical connection to the Internet. The domain levels beyond the SLD name need not refer to physically distinct devices. They can simply refer to different server programs running on the same processor or set of processors. The multiple server programs running on the same set of one or more processors are called virtual servers. In most computer operating systems, virtual servers are high-level systems objects. The domain administrator maintains a local name server that associates the name of each virtual server with its local IP address. The local name server may or may not be the same as the SLD name server. Each virtual server that resides on a particular physical device is given one IP address of the one or more IP addresses identifying that particular physical device. An additional database, usually established by the operating system of the device, associates the virtual server with a lengthy list of rights and privileges including a home directory on a storage device accessible by the virtual server.

To provide WWW services, the domain server must contain a web page that is first displayed to a user whose browser requests a connection to that domain web server. If a particular web page is not specified in the request or by the domain server, the user's browser is presented with the contents of a default page from the home directory having a file name often containing "home", such as "home.htm" or "home.html". The default file can have any name identified in setting up the virtual server system object.

Computer resources are associated with a server and are accessed by the server program. Computer resources include functions or buffers in peripheral devices like printers and scanners, memory media locations such as volatile random access memory (RAM) registers and non-volatile disk drive files, and other application programs such as spreadsheets, word processors, file management, financial services, trading on an exchange, network telephony, and many other known or emerging network applications. The naming convention followed on the Internet for specifying a service, a location and resource is called the Universal Resource Locator (URL). The URL form for identifying a resource is as follows:

ServiceDomainNameResource

File resources are specified by the directory and filename. Directory levels are separated by slashes "1" with level order increasing to the right. The file name appears to the right of the last slash. Service indicates how the resource is transferred and handled, for example whether FTP or HTTP protocols are used to transfer the resource.

The WWW follows this convention for identifying web pages. In the URL for a web page, the Service is specified by "http://www." The DomainName is the domain name where a web server can be found, i.e. the domain name specifies a web site. The Resource specifies the file name, which is the web page to be displayed on the user's browser. The filename is optional; if not specified the file name "home.htm" or "home.html" is used as a default name.

Two characteristics of a web site then are (1) a URL address, including a domain name with a SLD name maintained on a registry of the DNS, and (2) a home page file written in a hypertext markup language (HTML) residing in a home directory.

In use, the World Wide Web has become a popular medium for exchanging information among users of the Internet. Corporate and retail entities that wish to project an image of availability and accessibility often establish web sites with domain names related to their trade names. Internet users have come to associate a name in a web site's domain name as a commanding presence on the World Wide Web.

In a typical procedure, a promoter (e.g., a wholesaler, a retailer, a service provider, an advocate, a publicist or a politician) establishes a web site to reach targets (e.g., known contacts such as former customers, registered voters, residents of an area, referrals, purchased lists and unknown persons). The promoter then attempts to induce the targets to visit the web site by publishing or otherwise advertising the domain name of the web site. To reduce the amount the target must remember, the promoter may leave off the service prefix "http://" or "www" or both and omit the web page filename, relying on the default page name. Many inducements have been tried to lead the target to visit the web site. Without sufficient target visits and activity at the web site established by the promoter, the expense and effort of establishing the web site is wasted.

The process of establishing a web site involves registering the SLD name with an authorized agency (a registry) for the TLD and then establishing a domain server on a machine connected to the Internet, or connecting a machine to the Internet. The SLD registration process typically involves manual steps and the payment of fees. For example, registering a SLD on the "com" TLD involves:

finding a unique name not already registered (manual and tedious task since many short and simple names have already been registered);
identifying primary and secondary name servers for storing the SLD name;
obtaining a registration agreement from a ".com" registry;
manually filling out the registration agreement;
sending agreement to registry with registration fee (about $50 a year);
responding to errors in the agreement identified by the registry;
receiving notification that agreement is processed; and
waiting for registry to enter records into databases used by SLD name servers.

The information presented to the contact at the web site can be tailored in response to input provided by the contact such as by the contact's clicking on a product of interest. Delivery of product to a contact who places an order then requires the contact identify himself or herself and authorize payment either by making further entries through one or more dialog boxes, or by reliance on files (e.g., cookies) created by the server and stored on the contact's computer in a previous interaction between the contact and web site server, and retrieved by the web site server in subsequent interactions.

Promoters do not establish individual web sites for each of hundreds of targets, or more, without action by the target. The process of establishing a web site involves several manual steps, expense and delays as a SLD is registered and then additional effort as local name servers are configured and home page content is created. In addition, since few people would be motivated to visit such a web site, the promoter expects little financial return compared to the effort and expense expended in establishing such a web site.

What is needed are techniques to encourage contacts to invoke resources on a network, such as web pages at web sites, generated by a promoter.

In addition, techniques are needed to establish servers, such as web servers for web sites, on the network in bulk, cheaply enough to cost less than the expected gain obtained during use of resources on those servers.

SUMMARY

Several techniques of the current invention are directed to inducing contact activity at servers on a network by including contact name within resource location descriptions.

Some techniques of the current invention are also directed to automatically providing a large number of contact-specific servers, or resources, or both, that may be tailored for the contact without requiring action by the contact.

Some techniques of the current invention also apply to supplying web services by domain servers having contact-specific domain names.

One advantage of techniques from the present invention is that a promoter (e.g., wholesaler, retailer, advocate, charity or politician) can provide a large number of web sites, one for each contact (e.g., customer, potential customer, viewer, supporter or voter) whom the promoter has identified. Each web site can have a domain name that prominently displays the contact's identity. The psychological benefit to the contact of finding a web site devoted to the contact and with the contact's own identity as part of the domain name conditions the contact favorably and increases the chances that the result sought by the promoter will be achieved. For example, anecdotal evidence suggests that a contact exhibits a high probability of visiting a web site with a domain name bearing the contact's identity, when notified of the existence of the web site. Furthermore, a sale is completed a high percentage of times in such visits. Similarly, it is expected that such a contact will more likely make a donation to a charity when that charity establishes a web site bearing the contact's identity and relating the charity's work to the contact's concerns. As another example, it is expected that a voter will more likely vote for a politician who establishes a web site with the voter's identity relating the politician's position to the voter's activities.

According to one technique of the present invention for inducing a contact to invoke a resource prepared by the promoter on a network, the promoter generates a resource location description for the resource. The resource location description includes a name of the contact. The promoter also provides access to the resource at a location on the network according to the resource location description. The promoter also prepares a message to notify the contact about the resource location description for the resource.

According to a technique of the present invention for inducing a contact to visit a web site prepared by a promoter, the promoter generates a host name for the web site. The host name includes a name of the contact. The promoter notifies the contact of the host name for the web site, and configures a web server at the web site to process a request including the host name.

According to another technique of the present invention, a plurality of virtual servers are automatically generated on a set of one or more physical devices on a network. Each device has a network address. A database of information for a promotion is set up. A plurality of host names are generated for at least one physical device of the set of one or more physical devices. A particular host name includes information from the database and a domain name for a particular physical device. A name server is automatically configured to provide a particular network address of the particular physical device in response to requests to connect to the particular host name.

According to another technique of the present invention, content for a plurality of resources are automatically generated. The resources have corresponding resource location descriptions on a single physical device having a network address. A server for the physical device is configured to resolve all requests for service directed to the resource location descriptions by opening a certain file on a certain directory of the physical device.

According to another technique of the present invention, web content is automatically generated for a plurality of virtual web servers. The virtual web servers have corresponding host names on a single physical device having a network address. A web server for the physical device is configured to resolve all requests for service at the virtual web servers by opening a certain file on a certain directory of the physical device.

According to a technique of the present invention for conducting a promotion, a name of the promotion is included in a network address associated with the promotion. The network address is broadcast to targets.

According to a technique of the present invention for automatically generating a plurality of virtual servers on a set of one or more physical devices on a network, each device has a network address. A plurality of host names is automatically generated for at least one physical device of the set of one or more physical devices. A name server is automatically configured to provide, in response to requests to connect to a particular host, a particular network address of a corresponding physical device, and a time to live which is shorter than a time to live stored by the name server.

According to another aspect of the present invention, a computer-readable medium bears promotion information for use by one or more processors that are participating in providing resources on a network. The promotion information comprises contact information about a contact to receive materials as part of a promotion. The promotion information also includes a resource location description indicating where the resource can be accessed on the network. The resource location information includes information from the contact information.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is a block diagram of example records and fields in a contact database as updated in step 340 of FIG. 3A according to an embodiment of the present invention.

FIG. 5B is a flow diagram for details of step 310 of FIG. 3A for updating second level domain name servers according to an embodiment of the present invention.

FIG. 5C is a flow diagram for details of step 340 of FIG. 3A for updating local domain name servers according to an embodiment of the present invention.

DETAILED DESCRIPTION

Techniques for inducing visits to a promoter's web site, producing virtual servers in bulk, and providing contact-specific content on bulk produced virtual servers are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For example, the Internet, as used herein, is one example of a network of networks. The invention is not limited to the Internet. The IP address is an example of a network address and hardware physical location code for devices on a network of networks like the Internet, including future extensions of the IP address standards, such as an expansion to 64 bits. The URL is a specific example of a general resource location description and a general document location description for a network or a network of networks.

Hardware Overview

Figure 1:
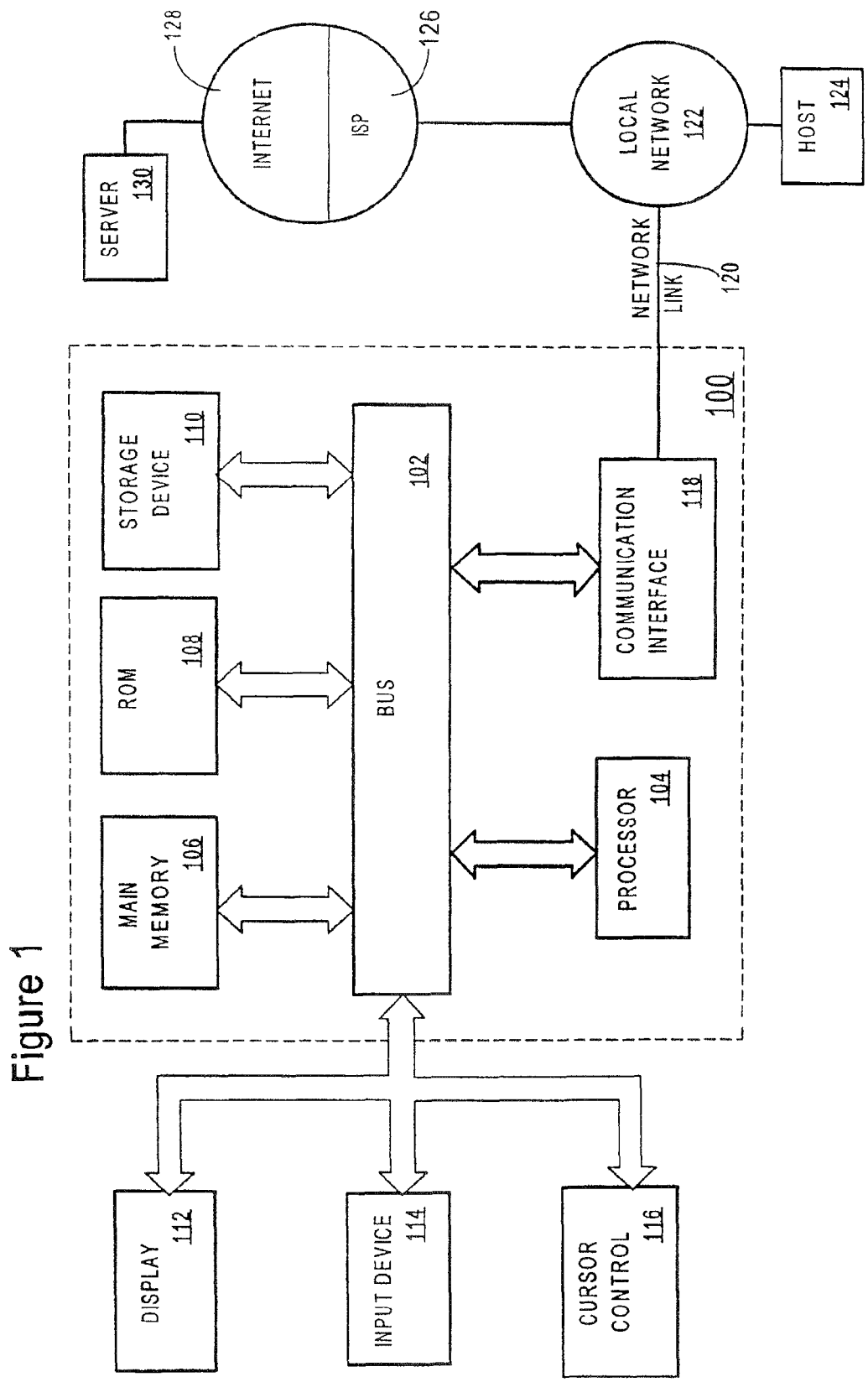
FIG. 1 is a block diagram that illustrates a computer system 100 upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. The input device 114 may also comprise voice actuated input device or any device converting sound to input signals. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for producing virtual servers on the Internet in bulk, and for providing virtual server host names or content or both that are contact specific. According to one embodiment of the invention, virtual server host names are provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for receiving input from a user of a web page with contact specific content or host name or both, as described herein.

The received code may be executed by processor 104 as it is received, and/or stored in storage device 110, or other non-volatile storage for later execution. In this manner, computer system 100 may obtain application code in the form of a carrier wave.

Overview of a Distributed Naming System

Figure 2:
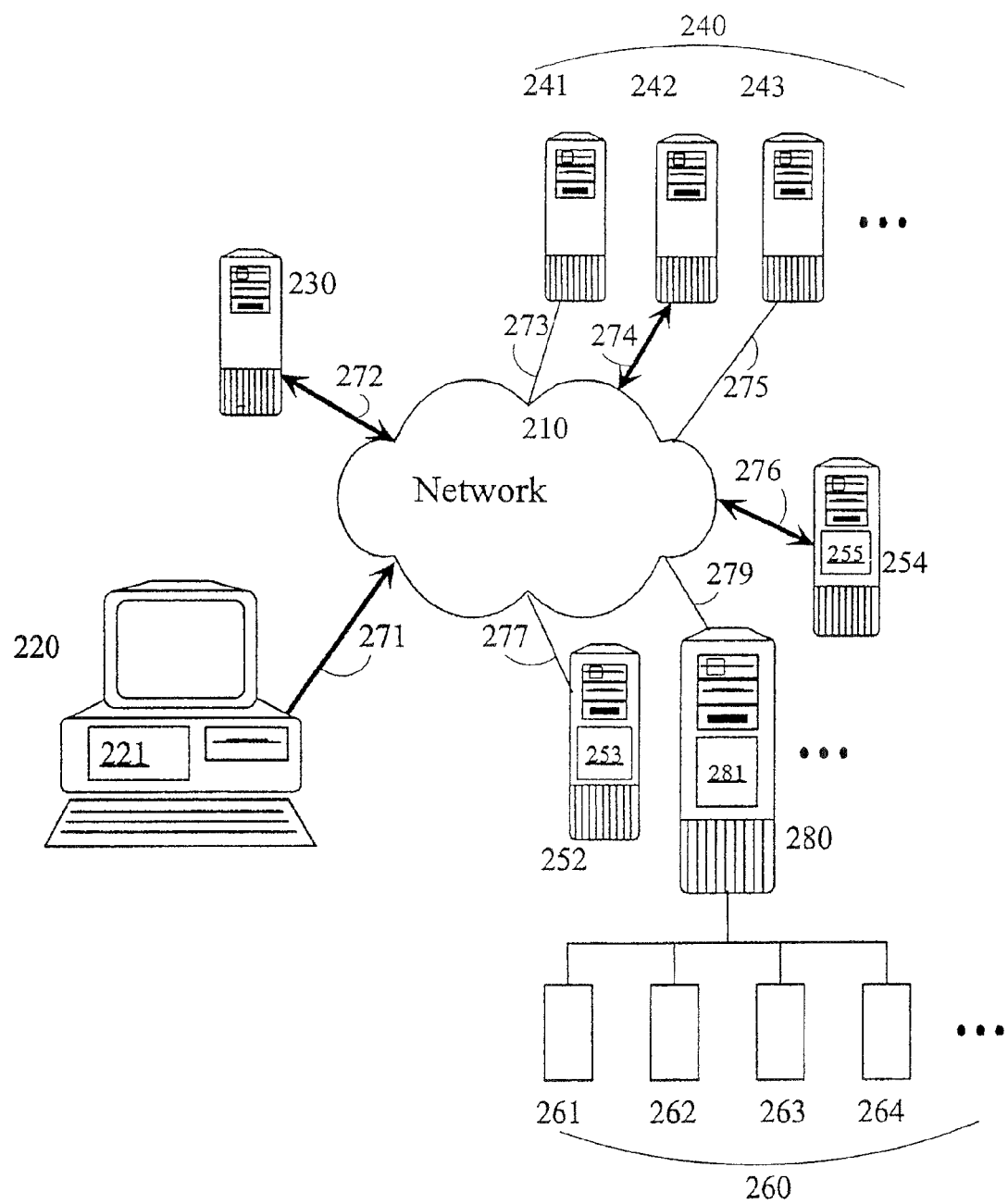
FIG. 2 is a block diagram of a domain server on a network with a distributed domain name system for mapping domain names to hardware addresses upon which an embodiment of the invention may be implemented.

FIG. 2 is a block diagram showing components of a distributed naming system on a network like the Internet. The conventional process for obtaining services over a network 210 like the Internet is to direct a request for service from a user computer 220 to a service providing program, called a server, on a particular hardware device, e.g. 280. The request travels from the user computer 220 over link 271 to the network 210 and then over link 279 to the physical device 280. The network identifies link 279 to device 280 with a network address, such as the Internet IP address. The IP address consists of 32 bits usually represented by four octets of eight bits each separated by dots, where the value of each of the eight bit octets is represented by a decimal number between 0 and 255. For purposes of illustration, we will say that device 280 has an IP address of w.x.y.z1 where w, x, y and z1 represent particular decimal values between 0 and 255, inclusive. For user on computer 220 to obtain services from the device 280, the request from 220 must indicate the IP address w.x.y.z1. In general, however, the user does not know the IP address of device 280, but, instead, knows the domain name, e.g. "www.HotTime.com" for the service provided by device 280. In addition, device 280 may provide a range of several services by running several different server programs (servers) on its hardware. Each of these different servers can have different domain names and appear to the user at computer 220 to be separate devices. These servers are called virtual servers 260 because they appear to be servers running on separate hardware devices even though they are on a single hardware device. To reach any of the virtual servers 260 on device 280, the user on computer 220 must then request one of the IP addresses of the hardware device 280, e.g., u.x.y.z1. However, in general, a user at computer 220 first learns the domain name of a server on the hardware device 280 or the virtual servers 260 and does not know the association of virtual servers to hardware or the IP addresses of the hardware. A domain name service maps a known domain name to a network address, such as an IP address.

The domain naming system (DNS) of the Internet authorizing agencies will be described as an example of a general naming system. In this system, when a user at 220 wants to connect to a particular domain name, e.g. physics.College-University.edu, a request for connection to physics.College-University.edu is sent over link 271 to a particular hardware device 230 running the domain name server for the user of computer 220. When the user's computer 220 is configured for connection to the network 210, a record is placed in a file on the user's computer 220. Among other items, the record contains the IP address of the hardware 230 running the domain name server for the user of that computer 220. This record on computer 220 contains the IP address of hardware device 230, e.g. q.r.s.t, where q, r, s, and t represent particular decimal values between 0 and 255, inclusive. The request to connect to physics.CollegeUniversity.edu is sent to device 230 for processing by the domain name server residing there. If the server on hardware device 230 has not recently or ever processed a request for connection to physics.CollegeUniversity.edu, then the name server on device 230 does not know the IP address of physics.CollegeUniversity.edu. The name server on device 230 knows at least the IP address of a root name server (not shown). The root name server (not shown) knows the IP addresses of several top level domain name (TLD) name servers. This information is in domain name files residing on hardware devices 240. For this example, hardware device 241 contains the name server for the TLD name ".com" and hardware device 241 has an IP address of a1.b1.c1.d1. Hardware device 242 with an IP address of a2.b2.c2.d2 has the TLD name server for ".edu." Similarly, there are hardware devices with known IP addresses running name servers for the other TLD names. For this example, hardware device 230, the domain name server for user computer 220, has previously obtained the IP address a2.b2.c2.d2 of hardware device 242 which runs the name server for .edu from previous requests processed by the name server on hardware device 230. Then the domain name server on 230 sends a request to IP address a2.b2.c2.d2 which arrives at the hardware device 242 along link 274 and is processed by the TLD name server resident there. The TLD name server on device 242 responds with a message addressed to the name server on 230 that says the second level domain (SLD) name server for CollegeUniversity.edu is hardware device 254 with IP address w.x.y.z0. The domain name server on hardware device 230 then sends a message to hardware device 254 requesting the IP address of the computer with the name server for physics.CollegeUniversity.edu. The server on computer 254 responds that the name server for physics.CollegeUniversity.edu is hardware device 280 with IP address w.x.y.z1. The domain name server on device 230 then sends a message to device 280 at IP address w.x.y.z1 requesting the IP address of the machine with the domain server for physics.CollegeUniversity.edu. The name server on device 280 then responds with the needed IP address. If the domain server for physics.CollegeUniversity.edu is running on a standalone computer, for example, hardware device 252, then the name server on device 280 will return the IP address of 252, e.g. w.x.y.z9. But if the domain name physics.CollegeUniversity.edu is a virtual server, e.g. virtual server 262 running on device 280, then the IP address of this virtual server 262 is one of the one or more IP addresses of the hardware device 280, e.g., w.x.y.z1. This whole process may take just a few seconds.

When the name server on device 230 receives this information, it will save the information in its memory for a certain amount of time dependent on a parameter called time to live (TTL) provided by the name server on device 280 with the message providing the IP address of domain physics.CollegeUniversity.edu. The domain name server on device 230 then sends a message to the user computer 220 that physics.CollegeUniversity.edu can be found at the IP address returned, e.g. w.x.y.z1.

In the following examples, the computer 220 will continue to represent the user's computer, the domain name server for the user's computer will continue to reside in hardware device 230, and devices 240 will continue to represent TLD name servers. Devices 252 and 254 represent primary and secondary name servers for the SLD names associated with destination servers. Device 281 represents one of the destination SLD servers whose address is stored on the SLD name servers 252 and 254. Virtual servers 260 run on hardware device 280. Other virtual servers on device 280 are represented by the ellipses adjacent to virtual server 264. Other destination SLD servers whose addresses are stored on name servers 252 and 254 are represented by the ellipses adjacent to device 280.

Functional Overview

Figure 3A:
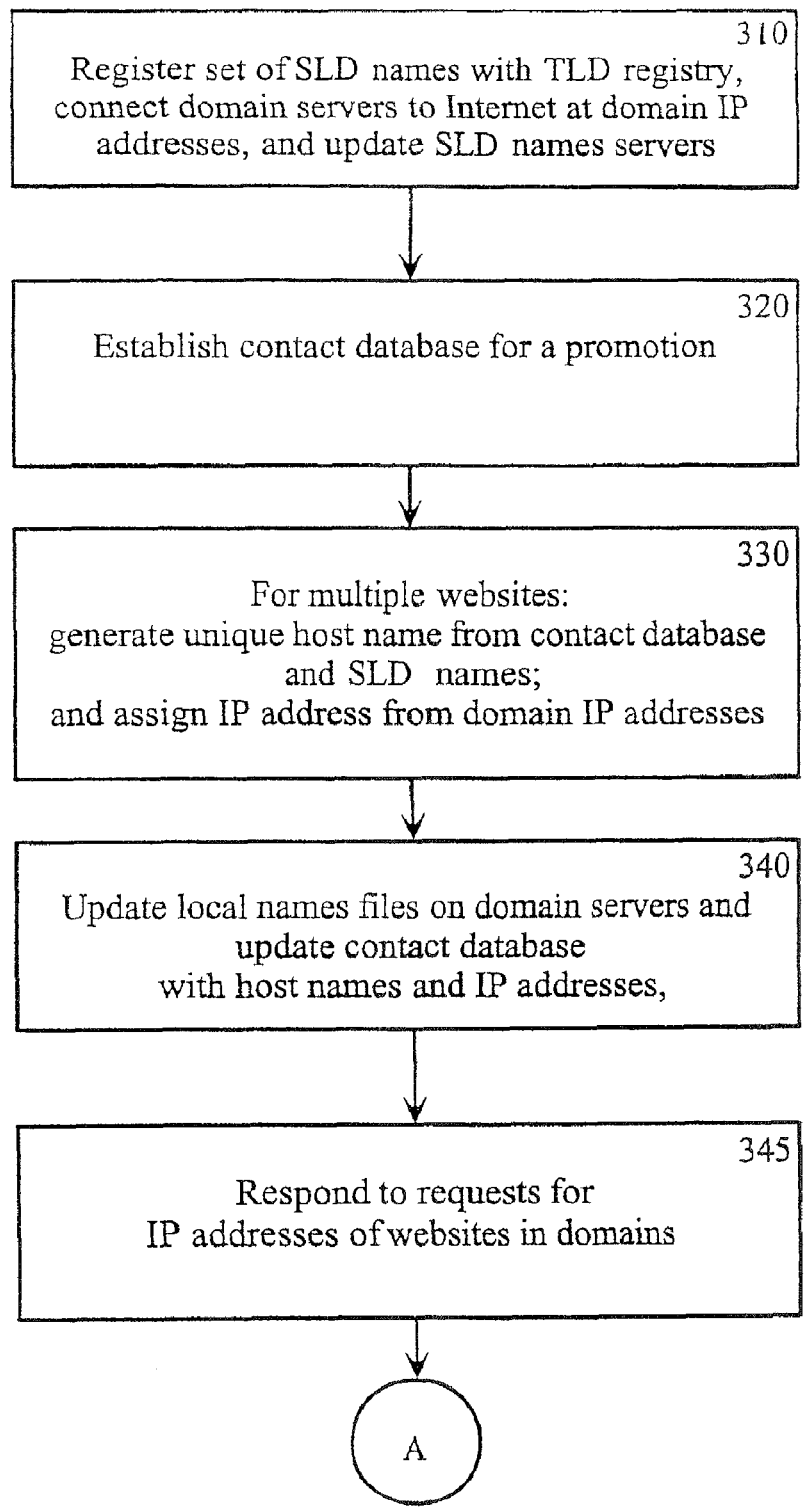
FIGS. 3A and 3B are flow diagrams for generating web sites according to an embodiment of the present invention.
Figure 3B:
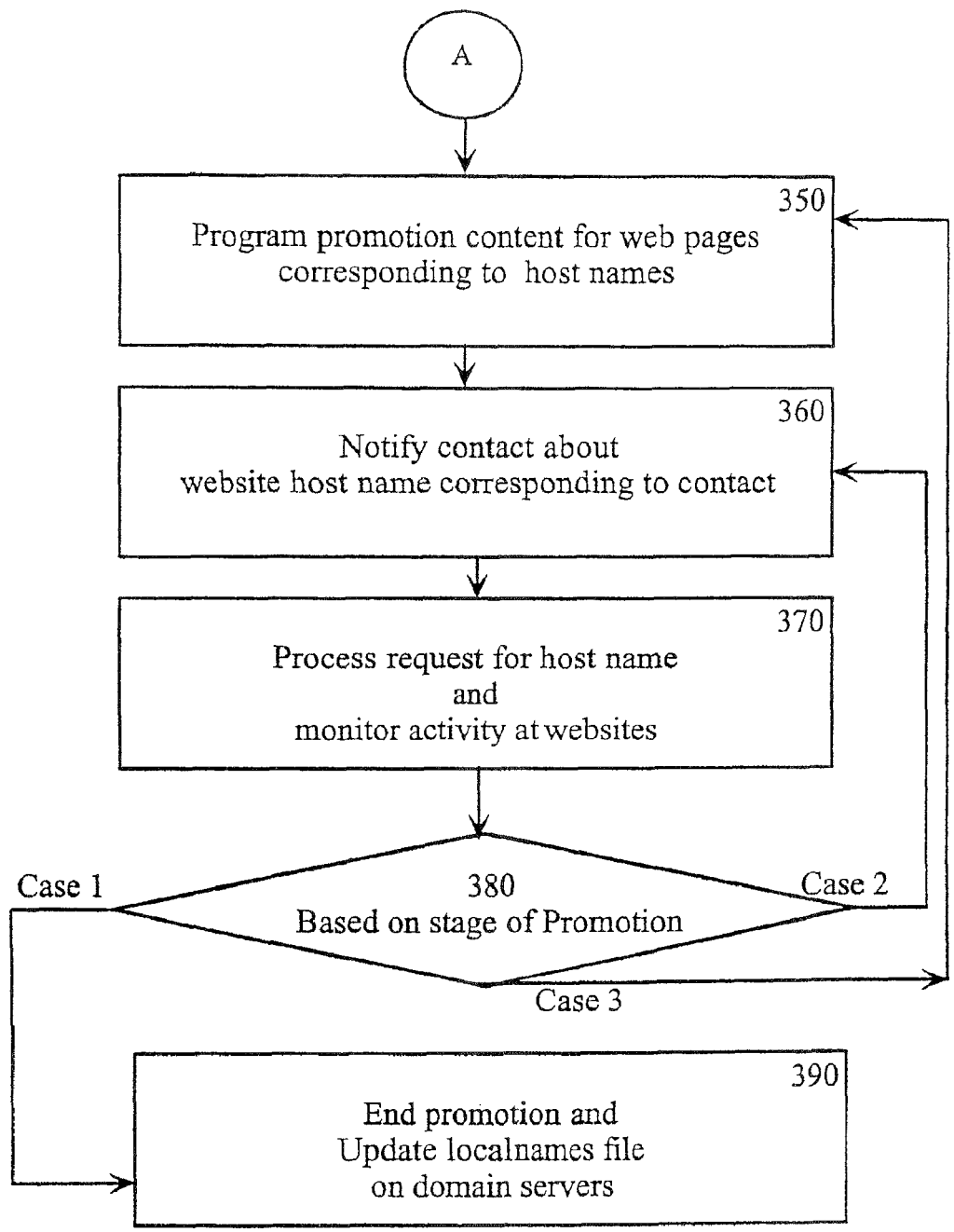

FIGS. 3A and 3B are flow diagrams for generating web sites according to an embodiment of the present invention. The same process can be used to generate virtual servers for any network service including ftp file transfer and email, and is not confined to World Wide Web services. When providing web services, a virtual server is a web site. The web site example is explained as a way of illustrating details of a particular embodiment of the current invention.

Conventional methods are used to set up SLD servers and SLD name servers. A set of one or more SLD servers are needed to practice the invention. The virtual servers of the present invention will be generated on the set of one or more SLD servers. Step 310 represents following conventional procedures for establishing a set of one or more SLD servers and registering their domain names with the TLD registry. For purposes of this example, four SLD names are registered with TLD registry.com: sld2, sld3, sld4 and sld5. These four SLD servers can be distributed over one through four physical devices. In one embodiment, each SLD server resides on a different physical device with a different IP address. For this example, however, two SLD servers will reside on one physical device with an IP address of w.x.y.z1 and two SLD servers will reside on a second physical device with IP address of w.x.y.z4. This is done to illustrate that the number of SLD servers available for managing the large plurality of virtual servers is variable compared to the number of physical devices. For a particular embodiment, the choice of number of SLD servers on each physical device will be determined by promoter preferences and performance issues of the various processors. None of the physical devices listed by the SLD name servers need have a domain name, and in this embodiment neither does, because they are identified directly by their IP address in the appropriate SLD name server.

In step 320, a promotional or project database is established. This step can be accomplished as simply as importing a database provided by client of the promoter to one of the physical devices in the set. Alternatively, the project database can be formed by keying information into a database. In another alternative, software programs can be written to read lists or flat files and to import that information into a database structure that can respond to queries. In the embodiment described here, the promotional database includes information about contacts known to the promoter or to the promoter's client, if any. In other embodiments, for example embodiments directed at targets not individually known, the database may include little or no contact information, In this case, the database includes primarily other information related to the promotion or project, such as the name of the project, the dates of a limited time promotion, the region affected by the project, or the causes or products that are the goal of the promotion. Such causes can be a given social cause, a given political position, or a particular set of one or more meetings.

In step 330, a pile of unique host names is generated from information in the project database, such as contact information, and the SLD names. Either all or some of the host names from the pile of host names are then assigned to the IP addresses of the set of one or more IP addresses for the one or more physical devices on which the SLD servers are located.

In step 340, the SLD name servers for the set of SLD names are updated with the host names assigned to IP addresses, and the corresponding IP addresses. Also updated are the local names filed on the domain servers that respond to requests for connection to subdomains under each SLD in the set of SLDs for the promotion.

In step 345, the local domain name server responds to requests for the IP address of one of the host names, or web sites. In this step, a user on user computer 220 is notified that a particular virtual server with one of the host names resides on a particular physical device with a particular IP address. Responding to such a request is a prelude to receiving a request from that user for a service to be performed by the virtual server with that host name.

FIG. 3B depicts steps directed to preparing a web page with contact specific content for returning to a user's browser on a user computer 220 in response to a request for web service. Many of these steps are not necessary if the promoter is interested only in obtaining many visits from contacts induced by use of the contact's name or information in the domain name. However, if the service to be provided to a requesting contact is to be contact specific, then at least some steps depicted in FIG. 3B are needed.

In step 350, the content of a web page is generated by a program which retrieves data from one or more databases depending on the host name included in the request for service. Since a particular host name corresponds to a particular contact in this embodiment, as can be determined from the contact database, any of the information in the contact database can be used to provide content or to determine which content to provide based on the host name. This step will be described in more detail later. In step 360, the contact is notified about the virtual server, for example, a web site bearing contact specific information within the virtual server's domain name. In a preferred embodiment, the information included in the virtual servers domain name includes the first name and last name of the contact. The notification can be sent by email if the contact's email is available, for example, within the contact database. Alternatively, the notification can be done by mail if the contact's mailing address is included in the contact database. In another alternative embodiment, such as when the project is directed to targets that include unknown persons, the notification can be broadcast, such as over TV or radio.

After the contact is notified of the virtual server bearing contact specific information, in the current embodiment, such as the contact's first and last name, the virtual server can expect a request from the contact for services at the virtual server, for example, a request for a web page. Activity is also monitored at the web site to determine if a web page was visited. Since each web site is associated with a contact, this information provides the promoter with an indication which contacts have responded to the notification of the promotional web sites, and which have not.

In step 380, different branches are taken depending on the stage of the promotion. In Case 1, a promotional duration has expired, and the promotion or project is ended and control flows to step 390. Here the host names associated with the expired promotion and contacts are removed from the name files of the local name servers using a name server update record that is conventional for local name servers. Subsequent requests for service having such host names will be returned with a message indicating that that server is no longer available. Flags in the contact database are updated in this step to indicate that contact is not to take up a host name in the pile of host names. In this way contact specific web sites can be generated that are temporary. An advantage of temporary contact specific web sites is that host name uniqueness does not have to be maintained over periods of times long compared to promotions. Thus host name uniqueness does not have to be maintained for all host names created over several years.

In Case 2, the stage of the promotion is such that characteristics of the promotion itself are not yet to be changed, but no visit has occurred even though sufficient time has passed, a new notification can be sent to the contact. This new notification reminds the contact of the existence of the web site bearing his name. This is indicated by the arrow returning control to step 360.

In Case 3, the promotion has advanced to a stage such that the characteristics of the promotion have changed, so the content of the web page may be changed. This is indicated by the arrow returning control to step 350. This path might be followed, for example, if a particular article being promoted is found to elicit little interest by visiting contacts. Then a different article might be substituted in the web page presented to the visitor. As another example, discounts offered to the visitor might be increased or decreased to reflect remaining supplies of the articles being promoted.

Using the steps depicted in FIGS. 3A and 3B, a promoter can establish a large number of virtual servers as web sites with contact specific domain names that induces or at least encourages contact visits to the web sites. Because the web sites are generated automatically they can be produced cheaply enough that the expected return from each visit is above the cost of producing the web site. In a preferred embodiment, the contact's first name and last name are included in the domain name comprising the host name for the web site. Experience has shown that about 90% of contacts notified about the existence of web sites with the contact's name in the web site's domain name often make visits.

In other embodiments, the promotion may not be directed solely at known contacts but at targets at least some of whom are unknown. In this embodiment, the contact database includes records with only promotional information.

Figure 4A:
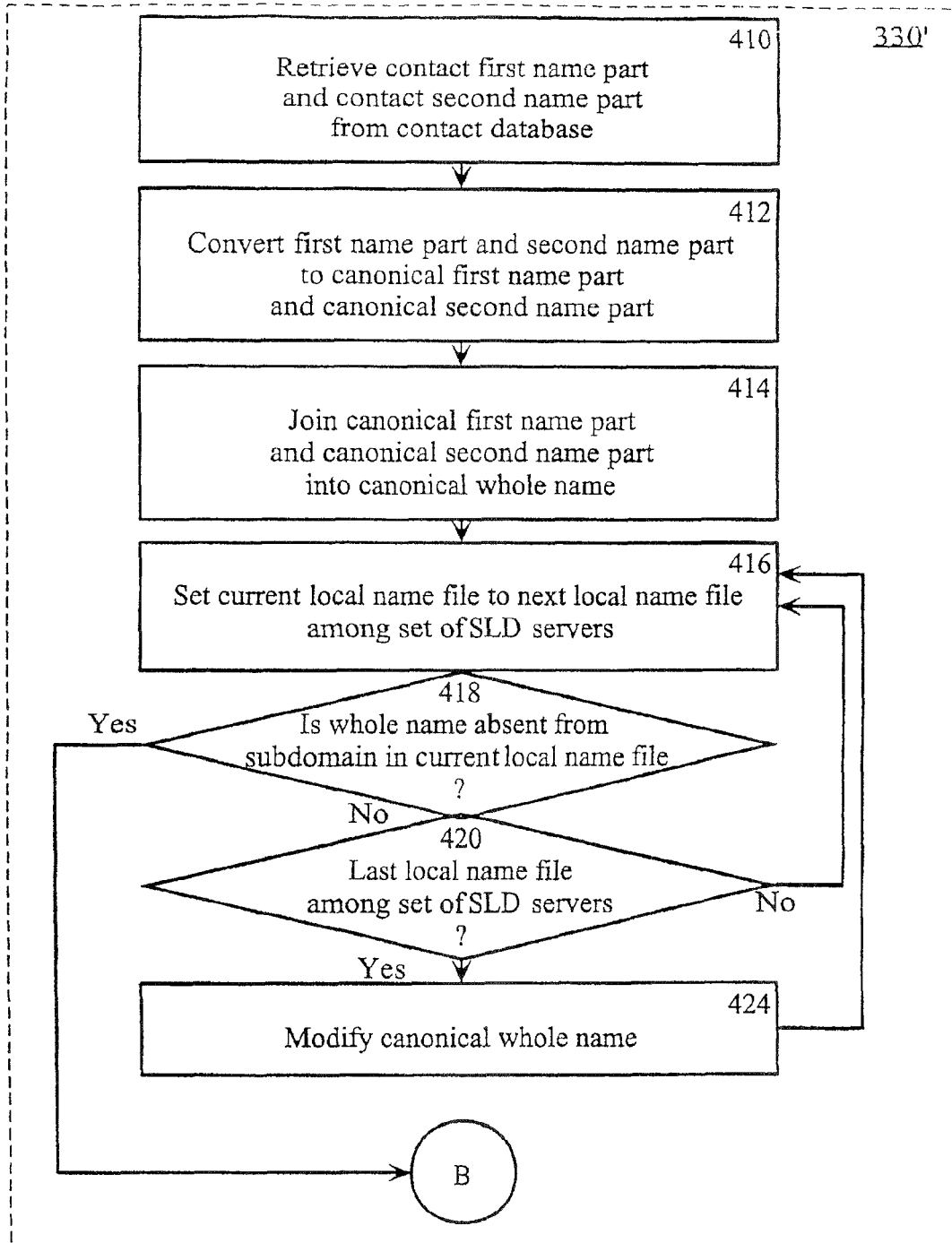
FIGS. 4A and 4B are flow diagrams for details of step 330 from FIG. 3A for generating multiple unique domain names according to one embodiment of the present invention.
Figure 4B:
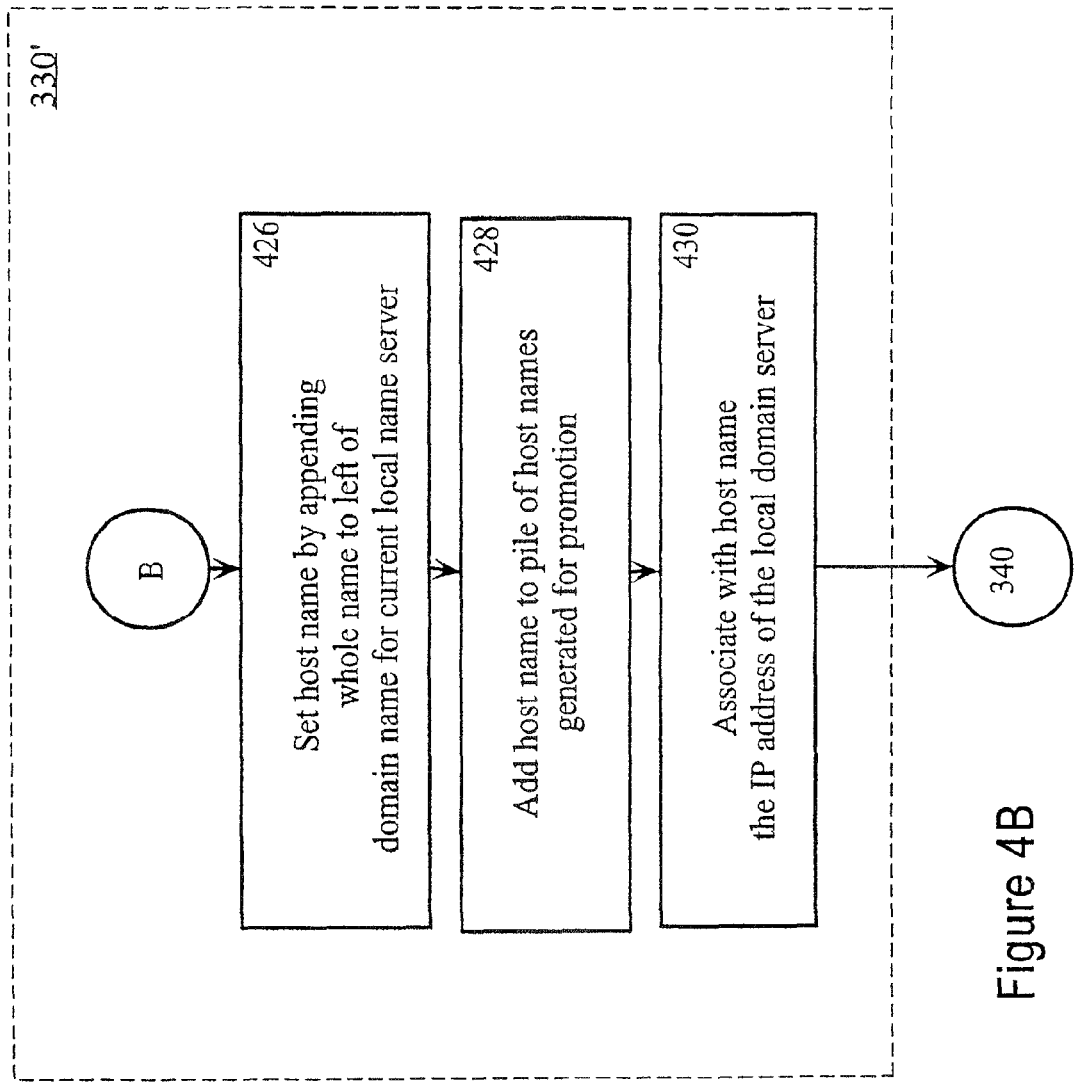

Automated Generation of Contact Specific Host Names for Multiple Virtual Servers FIGS. 4A and 4B are flow diagrams for details of step 330 from FIG. 3A for generating multiple unique domain names according to one embodiment of the present invention. This process is designated by step 330' indicating it is an optional alternative for other methods of generating unique host names from the contact database and SLD names. In this embodiment, a first name part and a second name part are retrieved from the contact database, in step 410. In step 412, each of the first name part and the second name part are converted to canonical name parts. A canonical name part follows the conventions for domain naming. For example a canonical name part does not include symbols for characters prohibited from domain names. Characters prohibited from domain names include all non-alphanumeric characters except underscore (_) and dash (-). That is, letters A-Z, numerals 0-9 and _ and - are allowed in canonical names, but other characters are not allowed. In step 414, first name part and the second name part are joined into a canonical whole name. In a preferred embodiment, the first and last name are separated by a dash.

At any instant in time, and at any level of domain name beyond the SLD, the local name server maintains a local name file listing the subdomains at the next level of domain naming, and associated IP addresses. The local name server is initially established by a domain server administrator, and may or may not be the same as the SLD name server. Subsequent updates are generated and sent to the local name server automatically in this embodiment, as described in more detail below.

Duplicate subdomain names are not allowed in that local name file. The local name file can be updated one name at a time or can be updated by adding multiple names at one time, or can be replaced entirely. However the local name file is updated, a check must be performed that a subdomain name being added is different from any other subdomain name being added or remaining in the local name file. It is anticipated that a block of new subdomain names can first be generated and then compared to names in the local name file. It is also anticipated that each potential subdomain name can be compared to every name in the local name file and already in the block before being added to the block. The best choice for a particular embodiment depends on performance issues.

In the exemplary embodiment, all domain names for all SLD servers maintained by a promoter's equipment over one or more promotions can be listed in a master list database so that all checks of uniqueness can be made against the records in the master list database. Uniqueness is then verified again when the records are loaded from the database onto the name servers. Any problems cause the offending record to be flagged as in error.

If there are several SLD servers in the set of SLD servers associated with a promotion, then the new virtual servers can be distributed among the SLD servers. This is desirable to distribute processing loads for serving the names. The virtual servers can be distributed among the SLD servers evenly, or in any ratio determined by the authority establishing the web sites. In the following example, we assume that a relatively even distribution of virtual servers among the set of SLD servers in the promotion is desirable. Alternatively, a relatively even distribution of virtual servers among the available IP addresses may be desirable.

In one embodiment, the local name file for one of the SLD names is made the current local name file in step 416. In step 418, it is determined whether the canonical whole name created from the contact database is absent from the subdomains in the current local name file. If the canonical whole name is absent from the subdomains, then it is an appropriate name for a subdomain for the current local name file. In this case control passes to point B, which will be described later. However, if the whole name is found in as a subdomain in the current local name file, then the whole name is inappropriate for this current local name file. In this case, the whole name should be compared to the subdomain names in the other local name files of the other SLD names available for the promotion. This is represented by the passage of control to set 420 where it is determined whether all the local name files associated with the set of SLD names in the promotion have been checked against this canonical whole name. If not, then the next local name file is made current and the whole name is compared to the subdomains there as represented by the arrow from step 420 to step 416.

If the last of the local name files have been checked and the canonical whole name has been found in each of them, then control passes to step 424 where the canonical whole name is modified. Then control passes back to step 416 where the modified canonical whole name is now compared to the subdomain names in each of the local name files associated with the promotion. The loop from 416 to 418 through 420 to 424 continues until the canonical whole name has been sufficiently modified to be unique in at least one of the local name files involved in the promotion. More details on how the canonical whole name can be modified in step 424 are given below.

Once a local name file is found which does not contain a subdomain identical to the canonical whole name, control passes to point B shown on FIG. 4B and into step 426. In step 426 a host name is set by appending the canonical whole name to the left of a dot. To the right of the dot is the domain name zone to which the subdomain belongs. The IP address of the name server responsible for this zone is known or can be obtained from the DNS using a request to connect.

For example, if the local domain is sld3.com and the canonical whole name is not found among the subdomains listed in the local name file for sld3.com then the whole name is appended to the left sld3.com. That is, if the canonical whole name is john-smith, then the host name becomes "john-smith.sld3.com." In step 428, the host name just generated is added to a pile of host names generated for the promotion. This pile can then be added as a block to the local name servers. Alternatively, the host name can be added directly to the local name server at this time.

In step 430 the IP address of the local domain server is associated with the host name. For example, the host name john-smith.sld3.com is associated with the IP address of sld3.com, which is w.x.y.z1. Control then passes to step 340 in FIG. 3A in which the local names files are actually updated.

Figure 4C:
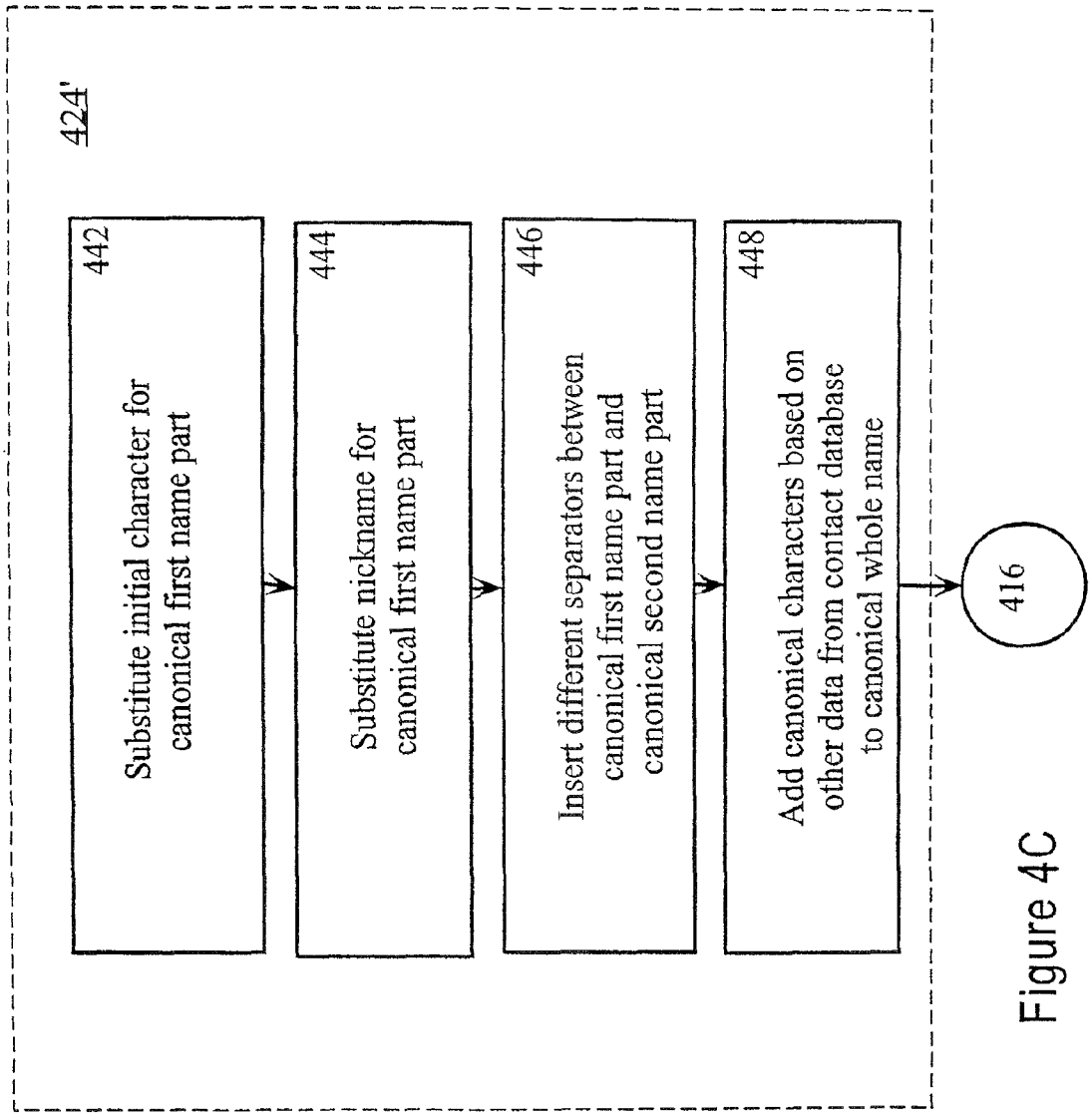
FIG. 4C is a flow diagram for details of step 424 from FIG. 4A for modifying a virtual subdomain name according to one embodiment of the present invention.

FIG. 4C is flow diagram for details of modifying a canonical whole name as performed in step 424 of FIG. 4A. The steps of FIG. 4C represent one alternative set of details for achieving a modified canonical name and so are labeled step 424'. Other methods of achieving a modified canonical name can be employed in step 424. In the embodiment of 424', several changes to the canonical whole name are considered. In the preferred embodiment, only one of the changes is applied on any pass through step 424'. Step 442 indicates that a canonical first name part can be changed to an initial for that first name part. For example, John can be replaced by the initial j. If the first name part has already been replaced with an initial in a previous pass through 424' then in step 444 a nickname is substituted for the canonical first name part. For example, if the canonical first name part is John and the initial j is not available, then John can be replaced by the nickname jack. If this also fails to be unique among all the local name files, then in step 446 a different separator is placed between the canonical first name part and the canonical second name part. This substitution includes multiple characters substituted for a single separator and using a different character for the separator. At this stage, canonical characters only are used for the separator, except the dot is not used because that indicates another level of subdomain.

If this substitution is still not sufficient, then in step 448 additional canonical characters are added to the whole name. In one embodiment, the additional characters are based on other data obtained from the contact database. For example, a zip code is be added or a street and number are added, or both. In this way, many permutations of the contact's name can be achieved to avoid duplication among subdomain names within a local name file. In another embodiment adding characters, a unique name is generated by simultaneously adding another level of subdomain. This is done by adding a dot to the right of the canonical whole name and a unique set of canonical characters to the right of the dot. In one embodiment, these latter characters are generated at random until uniqueness is achieved at its level of domain name.

The Contact Database

The contact database is one embodiment of a project database. The project database can be implemented in any of a variety of commercially available database systems. The information in a project database can be in one table or distributed over many tables according to a variety of schema that can be developed by a person of ordinary skill of the art of databases. It is only required that the project database contain some project or promotion specific information and fields for indicating a resource location on the network, such as a host name or complete URL. It is sometimes convenient to insert the IP address with the host name or URL in the project database.

In FIG. 5A, an example contact database is associated with a promotion indicated by a promotion name in column 550. All contact information shown in FIG. 5A are associated with the same example promotion here called a "Sweater, Inc. Spring 2000" promotion. Exemplary contact information stored for each contact include a contact first name, column 552, a contact last name, column 554, a contact company, column 556, a contact address, column 558, and a contact phone number, column 560. It can be easily appreciated that the columns in FIG. 5A may refer to a single field in a database record or to multiple fields in a database record. For example a contact address would normally comprise a record for a number and street, a record for a city, a record for a state, a record for a country and a record for a country code such as the U.S. zip code. The ellipses to the right of column 564 indicate that other contact information fields can be usefully maintained in the contact database, such as contact title, contact department, contact car model, and contact shoe size, among others.

At least one field is devoted to a host name associated with a contact, column 562. In this embodiment one other field is associated with an IP address, column 564, associated with the host name, but this is done more for convenience than necessity. When the contact database is first established the host name and IP address fields are blank. After step 430 of FIG. 3A, the contact database has been updated with a host name and IP address value for each contact for whom a virtual server or web site has been generated. In this example, the contact specific information included in the host name includes the contact's first name and the contact's last name, all lower case, separated by a dash. This whole name becomes the third level domain name, i.e., the subdomain name for the SLD name.

Row 570 shows the host name generated for contact John Smith of the Fancy Store in Central Park, N.Y. The third level domain name is john-smith. The second level domain name is sld2 and the top-level domain name is com. Since john-smith is part of a virtual server name, it has one of the IP addresses of the same physical device as its domain server i.e., physical device of the sld2.com server. In this embodiment that IP address is w.x.y.z1 as shown in column 564 of row 570. Looking down column 564, one can see that all the host names have one of the two IP addresses of the physical devices used in this promotion, i.e., w.x.y.z1 and w.x.y.z4. Column 562 shows that each succeeding contact is added to the next second level domain of the set of second level domains used for the promotion, i.e. sld2, sld3, sld4 and sld5. In row 578, column 562 shows that the next contact was placed in sld2, thus starting another cycle through the four SLD domains involved in the promotion.

The procedures to ensure uniqueness in host name are reflected in the host name given to the contact in row 582. This contact, Mary Smith, would naturally have been assigned to sld4, the next local name file in the sequence of four SLD name files. However, a Mary Smith is already in sld4.com by virtue of the contact in row 574. Therefore, when the canonical whole name mary-smith was compared to the subdomains in the local name server for sld4.com, the canonical name was not absent. Thus this canonical whole name could not be added to that local name file. Consequently, the next local name file was made current, i.e., local name file for sld5.com was made current. Since the canonical whole name mary-smith was not among the subdomains listed in the sld5.com name file, mary-smith was added as a subdomain in this name file. If the canonical whole name mary-smith had been found in every local name file, then the canonical whole name would have been modified according to one of the procedures shown in FIG. 4C. For example, step 442 would modify mary-smith to m-smith. If m-smith had not been previously added to at least one of the local name files, then it would added to the first of those local name files the loop happened upon.

Updating Domain Name Servers

When a record is added to a name server, the record includes a domain name, an IP address of the hardware device which will respond to requests for the domain name, a record type, a class, and a time to live parameter (TTL). The record types include an "A" record type and a "CNAME" record. The class includes IN for Internet.

The time to live (TTL) parameter affects the way domain name servers cache messages received from foreign name servers. For example, when the name server running on hardware device 230 for the user computer 220 requests the IP address of one of the virtual servers produced according to the present invention, the answer eventually returned from the name server for the virtual server is the IP address of physical device 280. To make a second request to the same virtual server more efficient, the foreign name server, such as the name server on hardware device 230 for user computer 220, stores the virtual server name and the IP address in a cache in its fast volatile RAM or slower non-volatile disk. The TTL parameter indicates a time limit on information provided to the cache. By setting a long TTL, the cache record will reside on their hardware device 230 for a long time before checking with the authoritative name server. By setting a short TTL, the domain server on device 230 will check quickly with the authoritative server. If the promotional web site expires soon after it is visited, or is intended to be visited only a few times, then, shortly after this information is cached, it is out of date. The short TTL will cause the name server on device 230 to quickly learn of the expiration of this domain name and remove this record from its cache.

According to one embodiment of the present invention in which the web sites are deleted shortly after being visited, the TTL for a user's domain name server, such as the foreign name server running on hardware device 230 for user computer 220, is set to a short time, for example 10 minutes. This short time to cache the record giving an IP address for one of the virtual servers is advantageous because that virtual server is expected to be used only a few times and often only once. That user will require that IP address only a few minutes after the record is cached. However, because so many virtual servers can be produced according to the present invention, the domain name server on physical device 230 may be swamped with tens of thousands and even millions of cached records for the virtual servers. Each of these many thousands of virtual server domain names will be used only a very few minutes. The burden on the cache resources of the foreign domain server is great if all the thousands or tens of thousands are maintained in cache at the same time. By specifying a short TTL, the foreign domain name server will retain the records for the IP address of the virtual servers a very short time and thus will likely not have to cache thousands or tens of thousands of records at the same time. Thus, according to one embodiment of the present invention shown in FIG. 5B, when a request to connect is processed, the return message includes a short TTL. This is accomplished by setting the TTL for all SLD names associated with the promotion on the SLD name servers to a small value, on the order of minutes. Alternatively, this can produced by storing longer values for TTL on the SLD name servers, but configuring the SLD name server to reduce the TTL from the large number stored to a short time, on the order of minutes, when the SLD name server is processing a request to connect to one of the SLD names associated with a promotion.

In step 340, the local domain name servers are updated based on the new host names generated. These local name servers should retain the record associating a virtual servers host name with an IP address for a time on the order of the promotion life. Therefore, FIG. 5C shows a particular embodiment 340' of the step 340 in FIG. 3C. Step 340' includes step 540 in which the time to live parameter is set to a large value on the order of the life of the promotion when the local name server is updated.

Figure 6A:
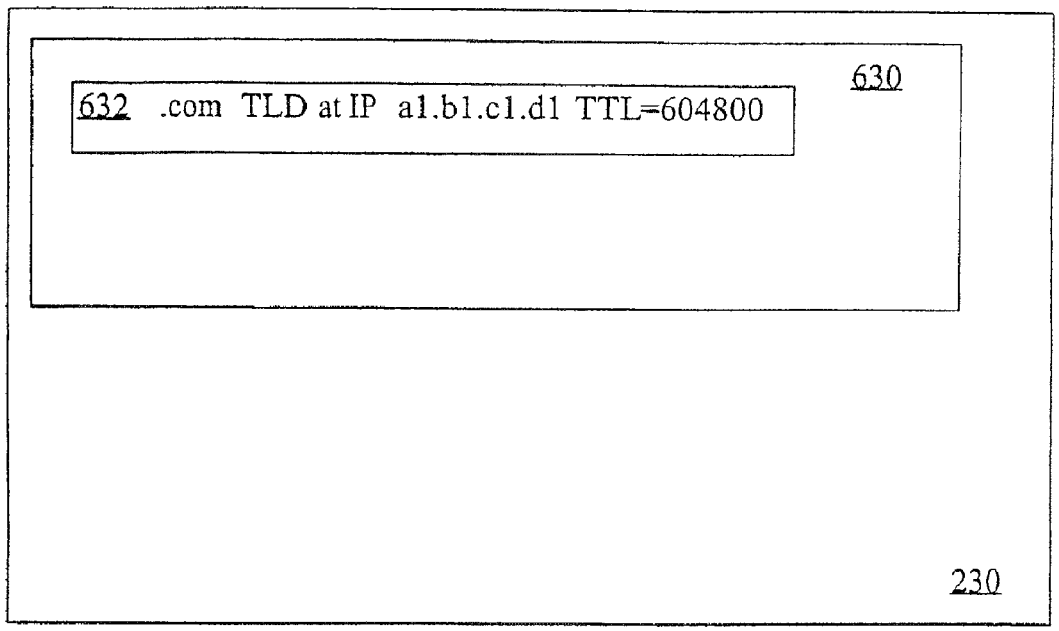
FIGS. 6A and 6B are block diagrams showing contents of a cache on a user's domain name server before and after a request for connection to a virtual server as a result of step 345 of FIG. 3A according to an embodiment of the present invention.
Figure 6B:
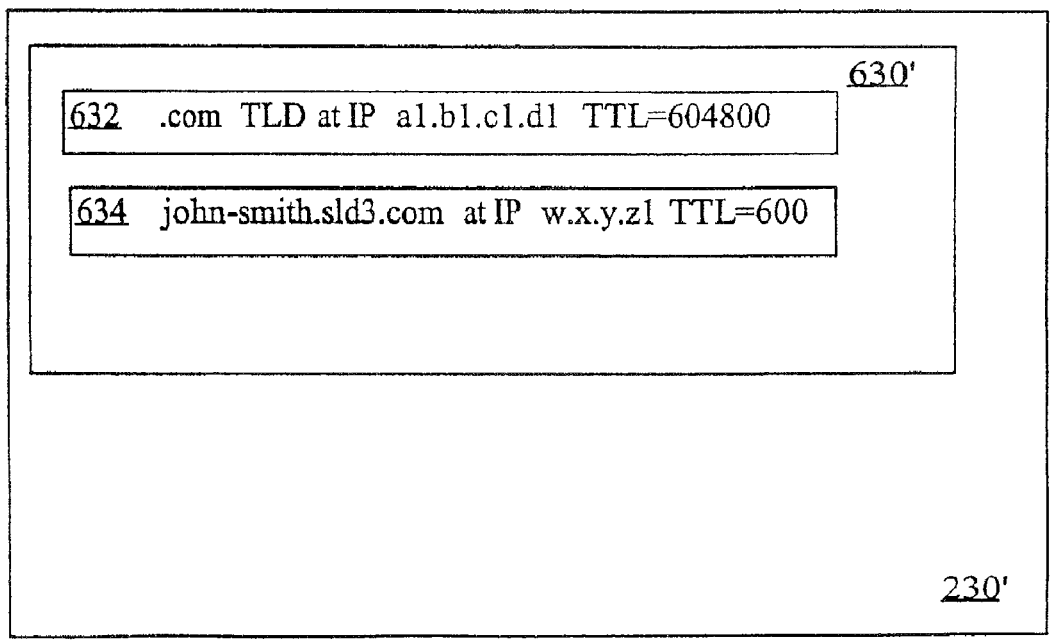

FIGS. 6A and 6B show contents of a cache on a user's domain name server before and after requests for connection to a virtual server with a domain name generated according to the present invention. In FIG. 6A, the computer device 230 running the user's domain name server includes a cache 630 of recent responses to request to connect. The cache includes records such as records 632 which identify a IP address with a domain. For example, record 632 shows that the cache includes the IP address of a top-level domain name server. Thus requests to the name server for .com can be processed by sending requests directly to machine 241 at IP address a1.b1.c1.d1 without having to go to a route name server first. Note that the TTL parameter in this record is set to 604,800 seconds, which corresponds to about 1 week. Thus, this record 632 will expire in a week. This forces the user's domain name server to initiate a new request for connection via the route name server at least once a week. In FIG. 6B, a request by the user to connect to a virtual server with a host name john-smith.sld3.com was recently resolved and an IP address of w.x.y.z1 was obtained. However, the TTL for this cache record is very short, set to 600 seconds, i.e., 10 minutes. This is shown in record 634 in the updated cache 630' in the updated user's domain name server 230'. This short TTL is beneficial in avoiding congestion on the domain server's cache 630' with thousands or ten of thousands of records associated with the bulk web sites generated according to the present invention.

Web Pages for the Virtual Servers

According to the procedures already outlined, a large plurality of virtual servers can be generated with host names including contact specific information. Properties of the virtual servers associated with each host name are stored by the operating system typically as a high-level system object. These properties includes exhaustive rights and privileges for the servers as well as routing requests for particular services to the particular servers that process those requests. Web requests are sent to a web server associated with a particular virtual server. The web server description includes a location for a home page, i.e., a home directory, where the first web page is located, and a name of a file containing the first web page to return in a response to a web service request. If no web page file is specified, the web server looks for a file name of the type home.htm in the specified directory. If no directory is specified, the web server goes to a home directory for the domain server.

According to a preferred embodiment, separate directories for the plurality of virtual servers are not defined in the system level objects. In this embodiment, therefore, all requests for web service for all virtual servers of a common domain server are directed to a home directory for the common domain. With this approach, only one web page file has to be constructed for the possibly large plurality of virtual servers defined as subdomains under the common domain. For example, all virtual servers in the common domain sld3.com are directed to the same home directory, the home directory of sld3.com. This is especially efficient if the same web page content is going to be presented to visitors of all the virtual server web sites.

This also is efficient when contact specific content is to be presented to visitors of the virtual server web sites. This is because the request, which specifies the host name of the virtual server, uniquely identifies the contact. By executing scripts that detect the host name, and access the contact or project database, contact specific processing and presentation of web pages can be achieved, without the overhead of maintaining a large number of web pages.

In this embodiment, a request from a user's web browser program to a web site includes the web site's host name and an IP address for the user's machine, along with many other variables, in a string of characters called CGI variables. The web server will then open the default web page file in the default common directory. Thus, in the preferred embodiment, the default web file in the common directory includes script statements that launch processes that can query databases, retrieve information, log activity, and generate a response or a report or both.

Figure 7A:
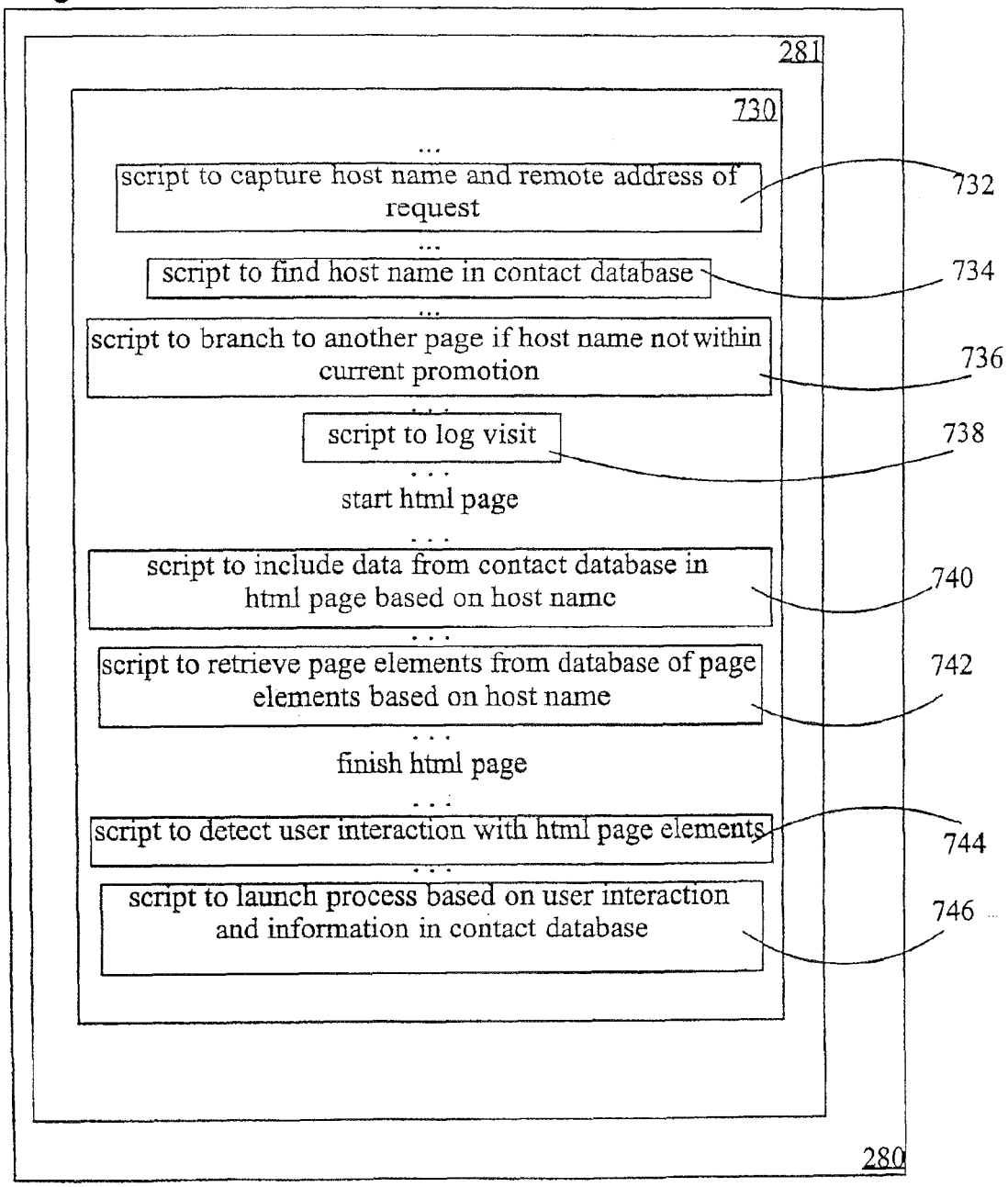
FIG. 7A is a block diagram of a home page file produced on a domain server during step 350 of FIG. 3B according to an embodiment of the present invention.

FIG. 7A depicts the contents of the default file 730 in the default directory 281 on the particular hardware device 280. The file 730 includes script 732 to capture the host name and remote address in the CGI variables of the request. In this embodiment, the file 730 also includes script to find the host name of the request in the contact database. In script 736 it is determined whether the host name is in the contact database or not. If the host name is not in the contact database then this request is invalid and can be directed to a different web page. If the host name is in the contact database but the promotion it is associated with has expired, then again the request can be diverted to a different web page because the host name is no longer valid. In the preferred embodiment, the request is routed to the home page of a system administrator. The file 730 also contains script to log the visit by writing information to a log file.

At this point, the visitor is permitted to view the html page. The html page is then constructed from standard page elements such as images and text and sound files along with contact specific information. The contact specific information is generated by script 740 to fill a particular element with information from the contact database based on the host name of the request. This is possible because the host name uniquely corresponds to a contact in the contact database.

In addition, file 730 in this embodiment includes script 742 to retrieve different page elements from a database of page elements based on the host name. These page elements don't contain contact specific information, but the decision to present them is based on the contact. For example, if the contact is male then page elements of interest to men will be inserted into the web page. These page elements don't include information specific to the contact, but the decision to include male versus female interesting elements is based on the contact. When script 742 and 740 have finished, the html page is ready for presentation to the visitor's browser.

The web page may be downloaded with script 744 to detect user interaction with the html page elements. Such scripts are known in the art for detecting user action on mouse and keyboard and other input devices. Finally, script 746 is included to launch a process based on the user interaction and information in the contact database. For example, if the user indicates that a product will be ordered, this script 746 can issue the order, send the ordered goods and a bill to the contact at the contact address.

Figure 7B:
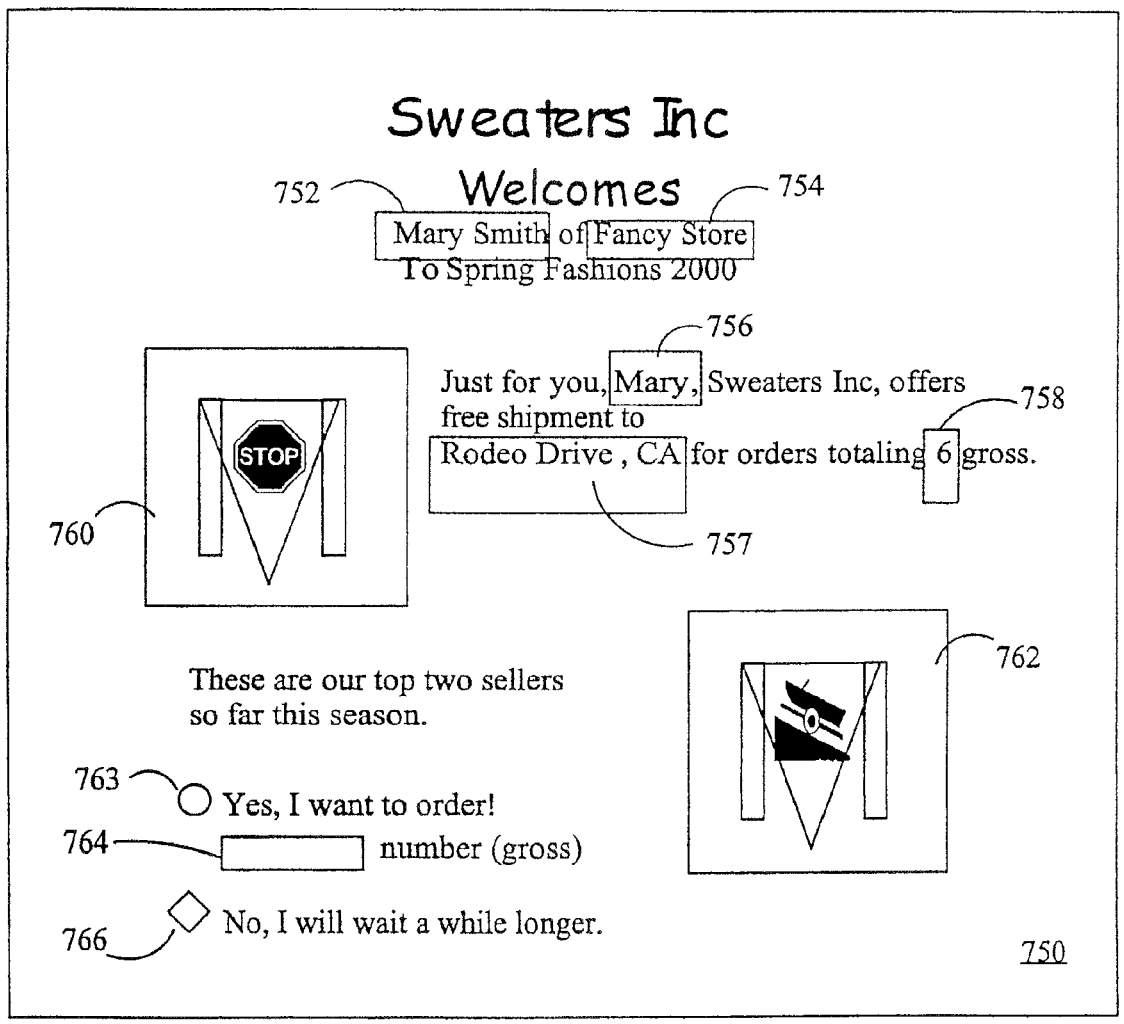
FIG. 7B is an illustration of a home page presented to a user in response to a web request to a virtual server during step 370 of FIG. 3B according to an embodiment of the present invention.

FIG. 7B shows an exemplary web page presented to the contact by the contact's browser as a result of a file on the common directory being opened by the user's request for web service. This is an example of a web page that would be produced when a request for web service is received based on a domain name ofmary-smith.sld4.com. The host name mart'-smith.sld4.com is found in the contact database depicted in FIG. 5A associated with the Sweaters, Inc. Spring 2000 promotion in line 574. Because of this, it is known that the contact is Mary Smith of Fancy Store at Rodeo Drive, Calif. with phone number 999-555-1010. In FIG. 7B, the contact specific information obtained from the contact database of FIG. 5A are shown inside dashed boxes. Mary Smith's name appears in box 752 and her company appears in box 754. Mary Smith's first name is used in box 756 to personalize a message. The message indicates pre-shipment of orders to Mary Smith's address in box 757 for orders totaling a certain number of gross specified in box 758.

Box 758 is an example of a decision to include information based on information in the contact database but does not present information from the contact database. In this case, knowing the costs of delivery to Mary's address the script determines how many gross of sweaters must be ordered to subsume the costs of shipping. To ship to Rodeo Drive, Calif., the script determines that at least 6 gross of sweaters must be ordered. Therefore the number presented in box 758 is contact specific information that did not come from the contact database. As another example of information that is contact specific, but not found in the contact database, is the choice of sweaters displayed in boxes 760 and 762. Because the contact database may indicate Mary is female, the top selling sweater among women is presented first in box 760 while the top selling sweater among men is presented second in box 762.

Other examples of page elements that do not contain information from the contact database but are contact specific include presenting different information to a corporate officer than a corporate engineer, presenting different information to a marketing vice-president than to a vice-president of technology or a corporate legal counsel, presenting different information to a franchiser than a franchisee, presenting different information depending upon industry of the contact, and any other choice of web page elements based on information in the contact database.

Boxes 763, 764 and 766 are examples of web page elements where the visiting user's actions are recorded and responded to.

Persistent Contact Specific Virtual Servers

The above examples generate transient, contact specific virtual servers for web sites and other services on the Internet that expire when a promotion ends. When the promotion ends, the virtual server names are removed from the name server and cease to respond to requests to connect. There are circumstances in which the promoter may wish the contact specific virtual servers and web site to persist for long or indefinite periods of time. A contact can then use the site repeatedly because web pages and objects on a persistent virtual server will persist across several visits. The virtual web site becomes a virtual private portal for use by clients of the contact, at the discretion of the contact. Additional functions beneficial to both promoter and contact can be provided.

For example, a document can be generated by either promoter or client, and both can collaborate on its evolution. A promoter can provide newsletter type information to a contact that is tailored to that contact. A web object could be generated that received video images from the promoter and a second web object can receive video images from the contact, essentially providing a contact specific video conferencing function. Information related to past accounts can be presented.

At least some of the information that will persist between visits may be sensitive and would require additional security measures for accessing the web site. For persistent web sites, therefore, scripts should be included in the default file that authenticates the requestor at web service. The host name identifies the requestor sufficiently well for receiving requestor tailored content. But the host name is no guarantee that the individual requesting access is the same as the individual who requires protection for the persistent information. Several methods are known in the art for authenticating an individual requesting access to a web site. These procedures include certificates of authenticity, passwords, fingerprints, smart cards with personal identification numbers (PINs) and encryption.

Figure 8:
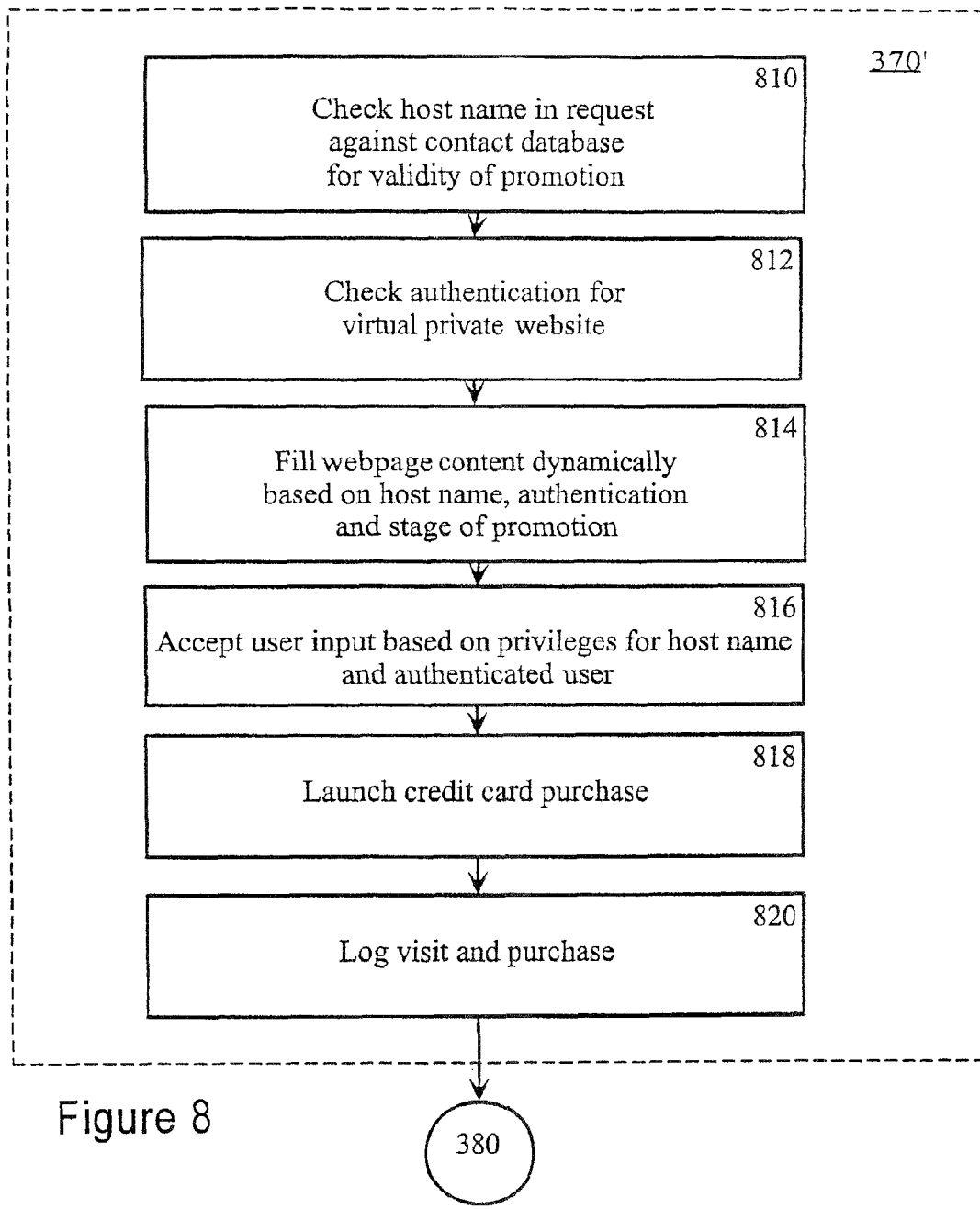
FIG. 8 is a flow diagram for processing and monitoring requests for service to a virtual server during step 370 of FIG. 3B according to an embodiment of the present invention.

FIG. 8 is a flow diagram for processing and monitoring requests for a service to a virtual server for another embodiment of step 370 from FIG. 3B. This embodiment supports both transient contact specific web sites and persistent contact specific web sites. In step 810, the host name in the request is compared to a contact database to determine that a promotion has not expired. In the case of a persistent web site, simply finding a host name in the contact database may be sufficient to satisfy this check because the persistent web site may not be subject to expiration. In step 812, authentication of the identity of the requestor is checked. Because of this authentication, the persistent contact specific web site becomes a virtual private web site. This check for authentication is not required for transient promotional contact specific web sites where sensitive information about the contact is not presented. In step 814, the web page content is dynamically filled based on the host name authentication and the stage of promotion using scripts like those depicted in FIG. 7A. In step 810, user input is accepted based on privileges for the host name and authenticated user. This includes a contact's indication of ordering a promoter's product, input on a collaborative document, and video or audio streams or both from the contact to the web site.

In step 818, a credit card purchase process is launched based on user input indicating the contact wishes to place an order for a product offered by the promoter, or donation to a charity. The credit card purchase process will send a purchase amount, credit card number, and credit card expiration date to a fulfillment house to complete the transaction. Because the contact is known from the host name, and because the information can be protected with authentication procedures, the contact's credit card number and expiration date may already be known to the promoter. This saves the contact from having to key in the credit card number and expiration date for every purchase, saving a tedious and error prone procedure.

In step 820, the contact's visit to the web site is logged and activities recorded such as the number and items purchased. Information recorded by the log can help a promoter in deciding whether the cost of maintaining the contact specific web site is offset by the revenues forthcoming per web site generated.

Figure 9:
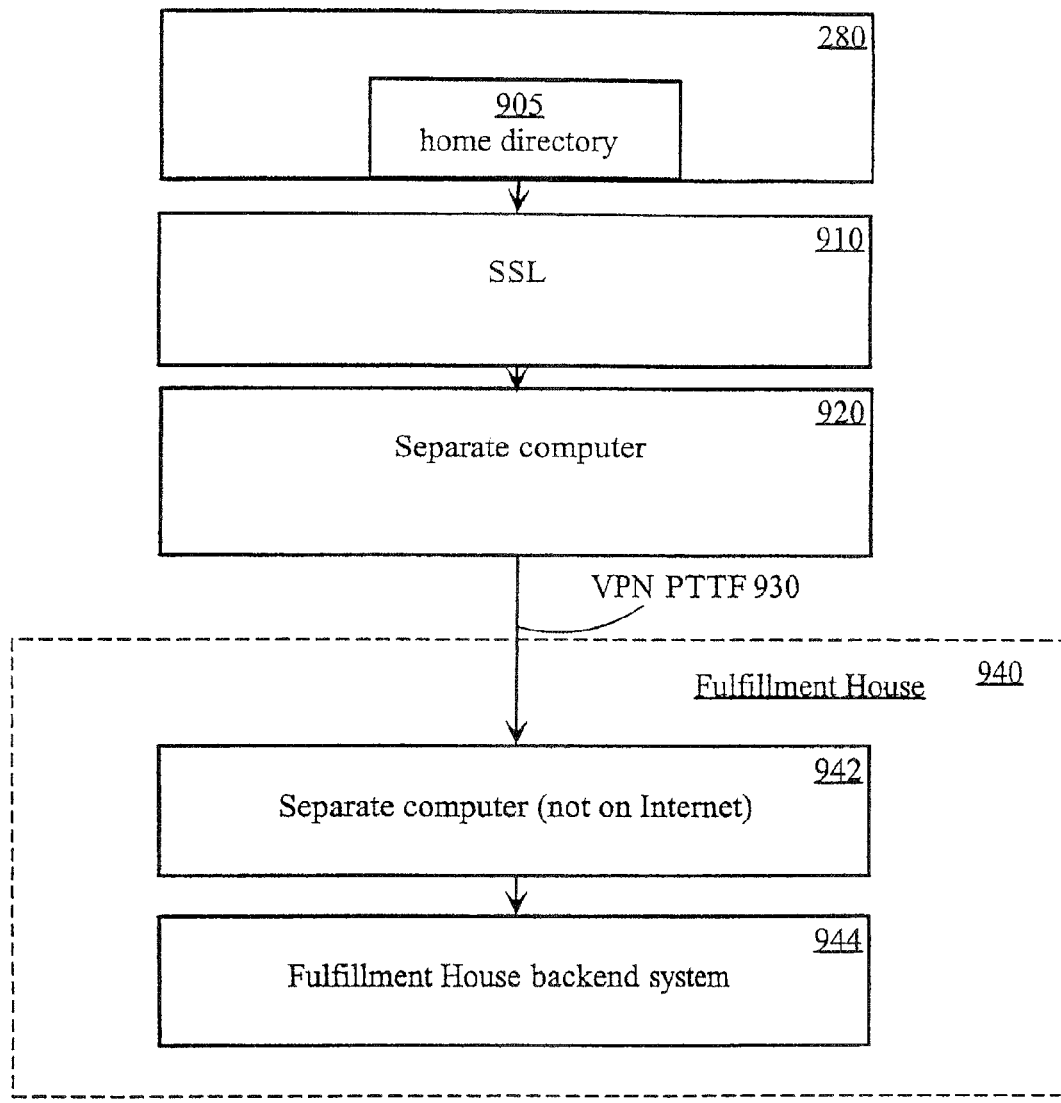
FIG. 9 is a block diagram of connections for processing a credit card purchase on a domain server according to an embodiment of the present invention.

Processing credit card purchases is hindered when the web site initiating the purchase is on a virtual server. Credit card information is processed over the Internet using a secure socket layer (SSL) or other protocols. To transfer credit card information over the Internet, the SSL invokes a certificate from a certification authority. However, certification authorities require a dedicated IP address which is not available for the home directories of the virtual servers. Thus, if the credit card information is not already in a database of the virtual server, the virtual server cannot receive that information from the contact. In this case, the virtual server will route the request for purchase to an SSL server, which will accept the credit card information from the contact and place the transaction data onto a separate computer with a stand along IP address. This process is illustrated in a block diagram of FIG. 9 where the home directory on the virtual server 905 resides on physical device 280, and a request is routed from the home directory 905 to the SSL server 910, and then to the separate computer 920 with a dedicated IP address. The credit card transaction is completed in a fulfillment house 940, which, in general, is remote from the separate computer 920. The final leg required to report this transaction at the fulfillment house is accomplished as follows. The fulfillment house backend system 944, which does the final credit card transaction processing, is connected to a separate computer 942 within the fulfillment house 940. The separate computer 942 periodically calls the separate computer 920 over the virtual private network link (VPN) 930. The VPN link can be a PC-to-PC link such as PTTF. Once connected, the separate computer 942 tolls the computer 920 to determine if any credit card transactions are recorded there. If so, those transactions are downloaded over the VPN link 930. From the separate computer 942 the information is passed to the fulfillment house backend system 944 where the transaction is completed.

Content Specific URLs

The procedures outlined above describe how domain names can be generated that use project/contact specific information in domain names of virtual servers. When a contact requests a web service from a web server, the contact can specify a particular resource or file accessible to the web server. As described in the background section, the URL specifies the service requested, the domain name of the server providing the service, and a resource location at the server. Thus, a URL address can be created which includes the project or contact specific information in any portion of the URL address.

Therefore, a contact/project specific URL is produced when a contact/project specific domain name is generated for the host, as described earlier. In addition, a contact/project specific URL can be produced without putting the project information in the domain name, simply by putting the contact/project specific information in the resource identification portion of the URL. This can be done by generating a directory or subdirectory with the project specific information in the directory name. This approach does not require the formation of additional local name servers or updates to other name servers on the Internet. This process would then require steps analogous to steps 320, 330, 350, 360, 370 and 390, and do without steps analogous to steps 310, 340 and 345.

Figure 10:
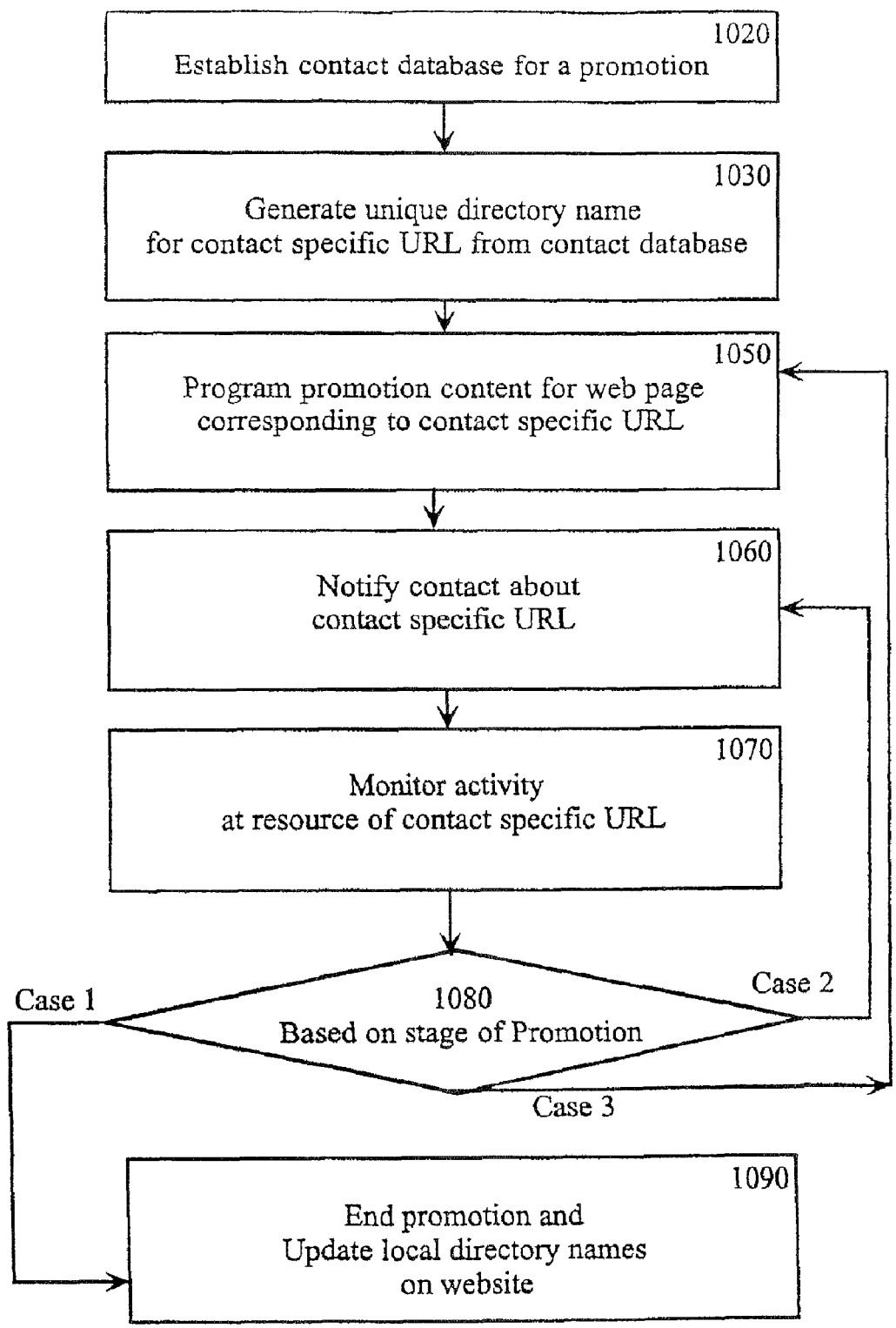
FIG. 10 is a flow chart for generating URLs with contact specific information in the resource directory name, according to another embodiment of the present invention.

FIG. 10 depicts steps in a method to generate and monitor contacts specific URL addresses for a promotion. In step 1020, similar to step 320, a contact database is established for a promotion. Step 1020 may differ from step 320 in that the database will have a field for the contact specific URL in lieu of, or in addition to, the fields for a contact specific host name and the associated IP address. In step 1030, a unique directory name is constructed from the contact database for use in a contact specific URL. In step 1050, a web page falling under the contact specific directory name is produced and programmed if necessary to provide promotion content and contact specific promotion content. In step 1060, the contact is notified about the existence of the resource having a URL that includes contact specific information. In step 1070, if the contact requests the resource with the contact specific URL, the activity at the contact specific URL is monitored. For example, scripts can be included in the resource of the URL to write to a log file when the web page specified by the URL is opened. Step 1080 is similar to step 380 in that, depending on the stage of the promotion, the user is again contacted to notify him of the contact specific URL, for example if the resource at the contact specific URL had not yet been opened, or that promotion content of the web page can be updated in step 1050, if the parameters of the promotion have changed. As in step 380, in step 1080, when the promotion is over, control passes to step 1090, where the promotion is ended and the contact specific directory names are deleted from the web site. As with the contact specific host names, the contact specific URL can be made persistent.

In the foregoing specification, the invention has been described with reference to specific embodiments thereof. It will, however, be evident that various modifications and changes may be made thereto without departing from the broader spirit and scope of the invention as recited in the appended claims and their equivalents. The specification and drawings are, accordingly, to be regarded in an illustrative rather than a restrictive sense.

What is claimed is:

1. A method for automatically generating a plurality of virtual servers on a set of one or more physical devices on a network, each device having a network address, the method comprising:

setting up a database of information;

automatically generating a plurality of host names for at least one physical device of the set of one or more physical devices, each particular host name of the plurality of host names comprising information from the database configured as at least one canonical subdomain name linked at least by at least one period to a domain name registered for a particular one of the at least one physical device, the step of automatically generating the plurality of host names comprising, for each host name generated:

retrieving at least one item of information from the database;

converting the retrieved information to at least one canonical name part; and linking the at least one canonical name part to the left of the domain name via at least one period to generate the host name; and automatically configuring a name server to provide a particular network address of the particular physical device in response to requests to connect to a particular host name.

2. The method of claim 1, further comprising automatically configuring a server for the particular physical device to respond to a request to the particular host name for service.

3. The method of claim 1, wherein:

the database of information includes contact information for a plurality of contacts; and the particular host name includes a name of a corresponding contact of the plurality of contacts.

4. The method of claim 3, said step of automatically generating the plurality of host names further comprising, if a subdomain canonical name in the host name is not unique within the domain name, then using the subdomain canonical name with a different domain name registered for the particular one of the at least one physical device.

5. A method for automatically generating a plurality of virtual servers on a set of one or more physical devices on a network, each device having a network address, the method comprising:

automatically generating a plurality of host names for at least one physical device of the set of one or more physical devices; each particular host name of the plurality of host names configured as at least one canonical subdomain name linked at least by at least one period to a domain name registered for a particular one of the at least one physical device, the step of automatically generating the plurality of host names comprising, for each host name generated:
  retrieving at least one item of information from a database of information;
  converting the retrieved information to at least one canonical name part; and
  linking the at least one canonical subdomain name part to the left of the domain name via at least one period to generate the host name; and
automatically configuring a name server to provide, in response to requests to connect to a particular host name of the plurality of host names,
  a particular network address of a corresponding particular physical device of the at least one physical device, and
  a time to live which is less than a time to live stored by the name server.

6. A computer program product for automatically generating a plurality of virtual servers on a set of one or more physical devices on a network, each device having a network address, the computer program product comprising:
  a nontransitory computer readable storage medium; and
  instructions residing on the nontransitory computer readable storage medium for causing one or more processors specially adapted for the execution of specific software components encoded on a nontransitory computer-readable storage medium to
    automatically generate a plurality of host names for at least one physical device of the set of one or more physical devices, each particular host name of the plurality of host names comprising information from a database of project information configured as at least one canonical subdomain name linked at least by at least one period to a domain name for a particular one of the at least one physical device, comprising, for each host name generated:
      retrieving at least one item of information from the database;
      converting the retrieved information to at least one canonical name part; and
      linking the at least one canonical name part to the left of the domain name via at least one period to generate the host name; and
    automatically configure a name server to provide a particular network address of the particular physical device in response to requests to connect to the particular host name.

7. The computer program product of claim 6, further comprising instructions to automatically configure a server for the particular physical device to respond to a request to the particular host name for service.

8. The computer program product of claim 6, wherein:
  the database of project information includes contact information for a plurality of contacts; and
  the particular host name includes a name of a corresponding contact of the plurality of contacts.

9. The computer program product of claim 8, the instructions to automatically generate the plurality of host names further comprising instructions to use the canonical subdomain name in the host name with a different domain name registered for the particular one of the at least one physical device, if the canonical subdomain name is not unique within the domain name.

10. A computer program product for automatically generating a plurality of virtual servers on a set of one or more physical devices on a network, each device having a network address, the computer program product comprising:
  a nontransitory computer readable storage medium; and
  instructions residing on the nontransitory computer readable storage medium for causing one or more processors specially adapted for the execution of specific software components encoded on a nontransitory computer-readable storage medium to
    generate a plurality of host names for at least one physical device of the set of one or more physical devices, each particular host name of the plurality of host names configured as at least one canonical subdomain name linked at least by at least one period to a domain name registered for a particular one of the at least one physical device, comprising, for each host name generated:
      retrieving at least one item of information from a database of information;
      converting the retrieved information to at least one canonical name part; and
      linking the at least one canonical subdomain name part to the left of the domain name via at least one period to generate the host name; and;
    store a particular host name of the plurality of host names with a particular network address of a corresponding particular physical device of the at least one physical device and with a time to live; and
    respond to requests to connect to the particular host name, with the particular network address and with a time to live which is less than the time to live stored.

11. A computer selectably connected to a network at a network address, the computer comprising:
  a port for selectable connection to the network;
  a nontransitory computer readable storage medium having project specific information; and
  one or more processors connected to the port and the nontransitory computer readable storage medium, the one or more processors specially adapted for the execution of specific software components encoded on a nontransitory computer-readable storage medium to generate a virtual server to provide a resource, to generate a domain name for the virtual server, to send the domain name and the network address to a name server on the network; and to prepare a message notifying a target of a resource location description for requesting the resource, the resource location description comprising the project specific information configured as at least one canonical subdomain name linked at least by at least one period to the domain name.

12. The computer of claim 11 wherein the project specific information includes at least one of a name of the target and a name of a promotion that expires.

13. The computer of claim 11, wherein the domain name includes the project specific information.

14. The computer of claim 11, wherein the one or more processors are further configured to provide a plurality of resources having a corresponding plurality of resource location descriptions, and to direct requests for the plurality of resources to one certain file on one certain directory.

15. The computer of claim 14, wherein the one certain file includes script to cause the one or more processors to dynamically generate a response for the request, the response depending on the resource location description.

16. A name server connected to a network at a network address, the name server comprising:
 a port connected to the network;
 a nontransitory computer readable storage medium having a name file; and
 one or more processors connected to the port and to the nontransitory computer readable storage medium, the one or more processors specially adapted for the execution of specific software components encoded on a nontransitory computer-readable storage medium, the software components, when executed, configured
  to receive a request to connect to a virtual server having a virtual server domain name configured as at least one canonical subdomain name linked at least by at least one period to a domain name registered for a particular physical device, each virtual server domain name generated by:
   retrieving at least one item of information from a database of information;
   converting the retrieved information to at least one canonical name part; and
   linking the at least one canonical subdomain name part to the left of the registered domain name via at least one period to generate the virtual server domain name;
  to retrieve from the computer readable medium a network address and a time to live associated with the virtual server domain name in the name file; and
  to send a response based on the request, the response including the network address and a time to live shorter than the time to live retrieved from the computer readable storage medium.

17. A system for generating promotion specific virtual servers comprising:
 a network;
 a name server connected to the network at a first network address; and
 a computer connected to the network at a second network address, the computer comprising
  a nontransitory computer readable storage medium having project specific information; and
  one or more processors connected to the port and the nontransitory computer readable storage medium, the one or more processors specially adapted for the execution of specific software components encoded on a nontransitory computer-readable storage medium, the software components, when executed, configured to generate a virtual server to provide a resource, generate a domain name for the virtual server, send the domain name and the network address to the name server; and prepare a message notifying a target of a resource location description for requesting the resource, the resource location description comprising the project specific information configured as at least one canonical subdomain name linked at least by at least one period to the domain name.

18. The system of claim 17 wherein the project specific information includes at least one of a name of the target and a name of a promotion that expires.

19. The system of claim 17, wherein the domain name includes the project specific information.

20. The system of claim 17, wherein the one or more processors are further configured to provide a plurality of resources having a corresponding plurality of resource location descriptions, and to direct requests for the plurality of resources to one certain file on one certain directory.

21. The system of claim 20, wherein the one certain file includes script to cause the one or more processors to dynamically generate a response for each of the requests, the response depending on a corresponding resource location description of the plurality of resource location descriptions.

22. The system of claim 20, the name server comprising:
 a name server port connected to the network;
 a name server computer readable medium having a name file associating a domain name of each virtual server of the plurality of virtual servers with the second network address and a stored time to live; and
 one or more name server processors configured to respond to all requests to connect to the plurality of virtual servers with a connect message including the second network address and a time to live in a cache of a requesting name server.

23. The system of claim 22, wherein the time to live in a cache of a requesting name server included in the connect message is less than the stored time to live associated with the domain name in the name file.

24. The system of claim 20, further comprising a root name server at a root network address, the root name server comprising:
 a root name server port connected to the network;
 a root name server computer readable medium having a name file associating a second level domain name of each domain name of each virtual server of the plurality of virtual servers with the first network address; and
 one or more root name server processors configured to respond to all requests to connect to the plurality of virtual servers with a response including the first network address.

\* \* \* \* \*